Oct. 29, 1963  J. BUGOSH  3,108,888
COLLOIDAL, ANISODIAMETRIC TRANSITION ALUMINAS
AND PROCESS FOR MAKING THEM
Filed Aug. 4, 1960                2 Sheets-Sheet 1

THICKNESS OF FILM

INVENTOR
JOHN BUGOSH

BY John W. Klooster
ATTORNEY

Oct. 29, 1963 J. BUGOSH 3,108,888
COLLOIDAL, ANISODIAMETRIC TRANSITION ALUMINAS
AND PROCESS FOR MAKING THEM
Filed Aug. 4, 1960 2 Sheets-Sheet 2

INVENTOR
JOHN BUGOSH

BY John W. Klooster
ATTORNEY 3,108,888
COLLOIDAL, ANISODIAMETRIC TRANSITION
ALUMINAS AND PROCESSES FOR MAKING
THEM
John Bugosh, Brandywine Hundred, Del., assignor to E. I.
du Pont de Nemours and Company, Wilmington, Del.,
a corporation of Delaware
Filed Aug. 4, 1960, Ser. No. 47,564
18 Claims. (Cl. 106—62)

This invention concerns novel, colloidal, anisodiametric transition aluminas and methods for making them from colloidal anisodiametric boehmite by thermal dehydration. The invention further relates to processes for preparing useful, strong, shaped bodies from such aluminas, and to certain of the products produced.

This application is a continuation-in-part of my prior copending application Serial No. 856,213, filed November 30, 1959, now abandoned.

More particularly, the invention is directed to processes for producing colloidal, anisodiametric transition aluminas by heating colloidal, anisodiametric boehmite at a temperature in the range of 300 to 1000° C. until the desired conversion has occurred, is further directed to the transition aluminas so formed, and is still further directed to processes for making strong, useful, shaped bodies by forming a mass of colloidal, anisodiametric boehmite particles into a body of the desired shape and heating the body at a temperature in the range of 300 to 1000° C. until the boehmite has been converted into a transition alumina, and optionally further heating said body at a temperature above about 1000° C. until the alumina has been converted to the alpha form. The invention is also particularly directed to strong, coherent, porous alumina-containing shaped bodies produced by said processes wherein the temperature of heating is below the sintering temperature, and to strong, coherent, dense, shaped bodies produced by processes wherein the temperature of heating is above the sintering point.

There are several modifications of anhydrous crystalline alumina which are sometimes classed as distinct types, and other times as mere variations of gamma alumina. As described in "Technical Paper No. 10 (Revised), 1956, by Allen S. Russell, Alcoa Research Laboratory, Pittsburgh, Pa.," modifications such as gamme, kappa, eta, delta and theta which are formed below 1000° C. above 300° are called "transition" aluminas. In the description which follows the invention will sometimes be disclosed with particular reference to gamma alumina, but from the context it will often be apparent that other transition aluminas are included.

According to the present invention it has been found that when colloidal anisodiametric boehmite is heated to increasingly higher temperatures, changes occur in its crystal structure with simultaneous dehydration. In the temperature range of from about 300° to 1000° C. it is converted to gamma alumina without major change in size or shape of the particles, especially at temperatures below about 850° C. At temperatures from about 1000° C. to about temperatures where sintering occurs (say, about 1300° C.), the alumina is converted to alpha alumina or corundum. By heating anisodiametric colloidal boehmite bodies to temperatures just below the sintering point alpha alumina structures are produced having unique and superior combinations of porosity and strength.

*The Colloidal Anisodiametric Boehmite Starting Material*

Figure 1:
FIGURE 1 is a sketch of an extruded article prepared by heating a hydrated mass of colloidal anisodiametric boehmite at about from 350° C. to 800° C.
Figure 2:
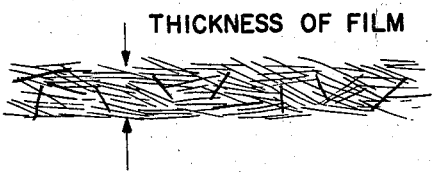
FIGURE 2 is a sketch of a cross section of a cast sheet article prepared by air drying a hydrated film of colloidal anisodiametric boehmite fibrils and then heating to from 350° C. to 800° C.
Figure 3:
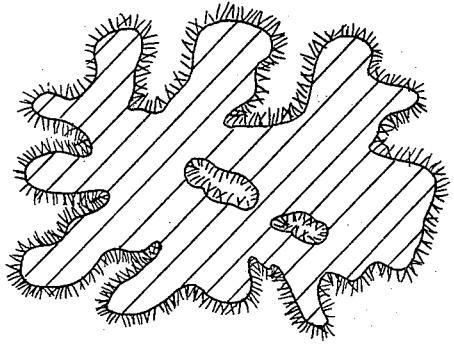
FIGURE 3 is a diagrammatic representation of a cross section of a macro-porous ceramic body having pores lined and partially filled with fibrous gamma alumina.
Figure 4:
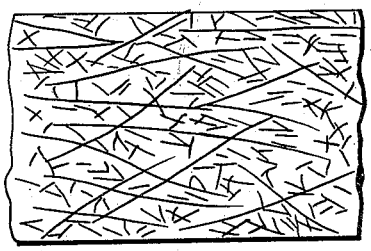
FIGURE 4 is a diagrammatic representation of a cross section of a sheet composed of fibrous gamma alumina and asbestos fibers.
Figure 5:
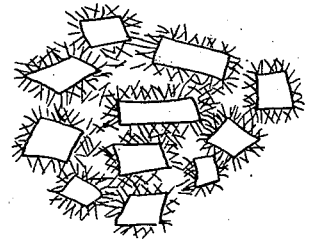
FIGURE 5 is a diagrammatic representation of a cross section of a shaped body of zeolite crystals bonded together with a fibrous gamma alumina.
Figure 6:
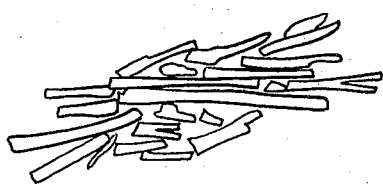
FIGURE 6 is a sketch of a portion of a shaped body of porous theta alumina derived from fibrous boehmite by heating it at 1000° C.
Figure 7:
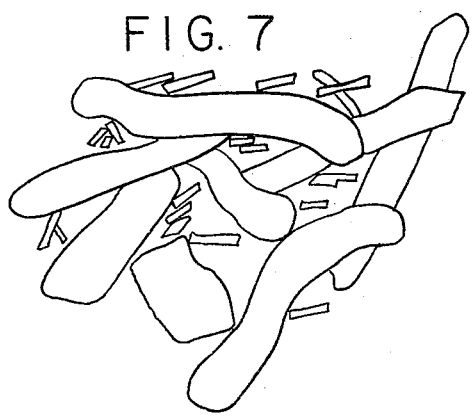
FIGURE 7 is a sketch of a shaped body of porous alpha alumina derived from fibrous boehmite by heating for three hours at 1100° C.
Figure 8:
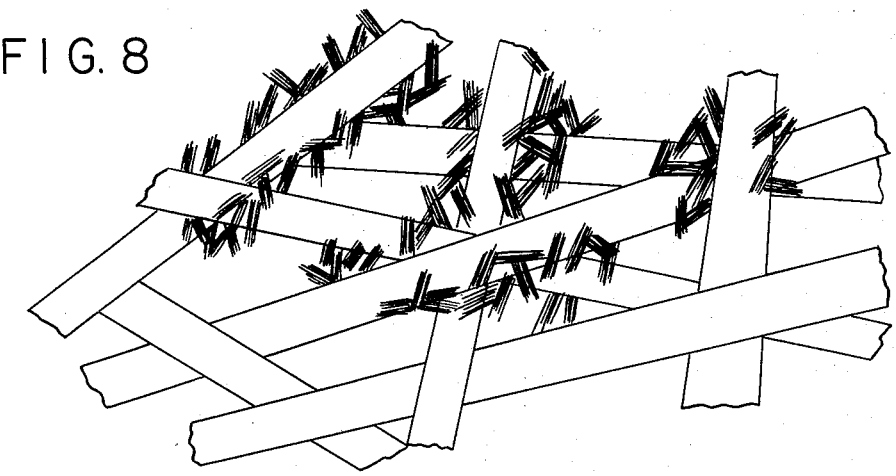
FIGURE 8 is a diagrammatic representation of a porous body consisting of potassium titanate fibers and alpha alumina, the latter being derived from fibrous boehmite by heating at from 1050° C. to 1150° C.
Figure 9:
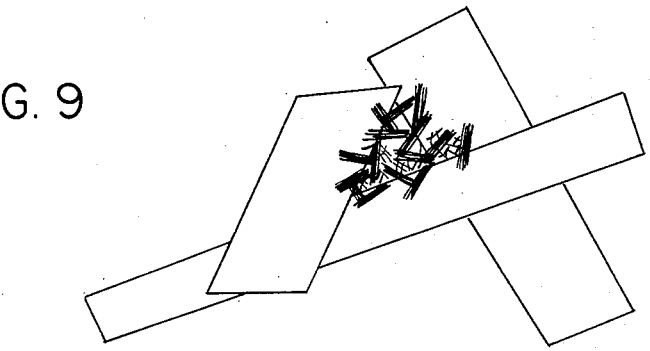
FIGURE 9 is a diagrammatic representation of a porous, coherent shaped body comprising dehydrated alumina in the crystal forms gamma, theta and alpha, said alumina being derived from fibrous boehmite.
Figure 10:
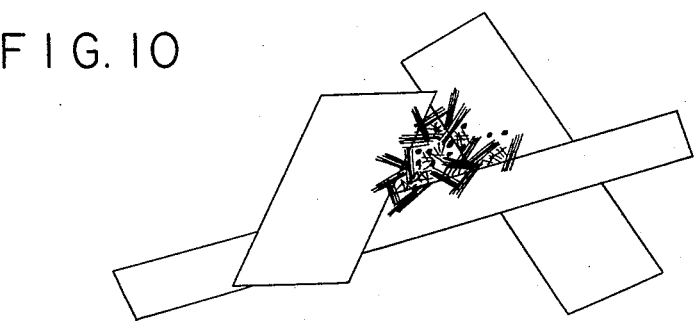
FIGURE 10 is a diagrammatic representation of a porous, coherent shaped body comprising finely divided nickel and dehydrated alumina, said dehydrated alumina derived from fibrous boehmite.

For convenience the term "colloidal anisodiametric boehmite" will be used herein to refer to alumina monohydrate having the boehmite crystal lattice in the form of particles of colloidal dimensions which are anisodiametric, i.e., which do not have equal diameters or axes. It is preferred that the particles be rod-like, or in the most preferred case, fibrous. Colloidal anisodiametric alumina monohydrate particles have an average length from about 10 to 1500 millimicrons at the extremes and have axial ratios of at least 3:1 and in the preferred case have lengths of 25 to 1500 millimicrons. These preferred fibrils are in the shape of well-formed little fibers or fibrils. These fibrils have at least one dimension in the colloidal range (i.e., from 1 to 150 millimicrons) and the fibril diameters in a particular fibrous boehmite product are usually quite uniform.

Fibrous boehmite and methods for its preparation are extensively described in U.S. Patent No. 2,915,475, issued December 1, 1959, to John Bugosh.

Colloidal anisodiametric boehmite can also be prepared according to methods described in copending U.S. patent application Serial No. 855,970, filed November 30, 1959, by John Bugosh.

Although, as noted, colloidal anisodiametric boehmite particles having axial ratios averaging at least 3:1 are useful in this invention, fibrous boehmite fibrils having axial ratios of 20:1 or more are preferred as starting materials. The axial ratio can be as high as 300:1 or even higher, but if higher processing the products is more difficult. Ordinarily the breadth and thickness of a fibril will be of the same order of magnitude and these dimensions will each be less than about 15 millimicrons, but not much less than about 3 millimicrons. It is preferred that the diameter of colloidal anisodiametric boehmite particles be in the range of from about 3 to 10 millimicrons. Such a form of boehmite is never found in nature and it is distinguished from naturally occurring or synthetic non-colloidal crystalline boehmites by having a specific surface area of at least 100 square meters per gram.

The length of the boehmite fibrils can be determined by electron micrograph measurements. Preferred fibrils have lengths on the average from about 25 to 700 millimicrons. More specifically, it is preferred that the fibrils of fibrous boehmite range from about 25 to 330 millimicrons. In speaking of particle size and shape, reference is made to the average fibril particle; that is, the average length or width of all such particles in a given sample or quantity of material.

The fibrous boehmite fibrils are further defined by their specific area, which provides an accurate and sensitive method for ascertaining the smaller two dimensions of the particles. The specific surface areas of the fibrils can be determined by nitrogen adsorption. In general, the fibrous boehmite fibrils can have specific surface areas ranging from about 100 to 400 square meters per gram ($m.^2/g.$). However, it is preferred to use fibers having specific surface areas ranging from about 200 to 400 $m.^2/g$. Most preferred are fibrils having a specific surface area in the range of from about 250 to 350 $m.^2/g$.

Complete descriptions of the various techniques used for physically characterizing fibrous boehmite fibrils are given in, for example, the aforenoted Bugosh U.S. patent.

While the fibrous boehmite can be in various forms or states of agglomeration, it is preferable for most purposes of the invention to use fibrous boehmite having the individual fibrils agglomerated as little as possible.

*Optional Starting Materials*

A number of different materials can be advantageously composited with fibrous boehmite to produce the products of the invention.

Particularly valuable additives which can be composited with fibrous boehmite are non-boehmitic aluminas, i.e., aluminas which do not contain alumina monohydrate having the boehmite crystal lattice, such as calcined alumina. Another useful alumina is low bulk density alpha alumina.

Physical characteristics of some alpha aluminas which optionally can be included with the boehmite starting material are shown in the following table:

| Typical Properties | Type A-2 | Type A-14 | Type T-61 | Type T-71 | AA |
|---|---|---|---|---|---|
| $Al_2O_3$ | 99 | 99.4 | 99.5+ | 99.5+ | 98 |
| $SiO_2$ | 0.02 | 0.12 | 0.04 | 0.04 | 0.6 |
| $Fe_2O_3$ | 0.03 | 0.03 | 0.06 | 0.06 | 0.6 |
| $Na_2O$ | 0.45 | 0.04 | 0.02 | 0.03 | 4- |
| Loss on ignition, 1,100° C | 0.2 | 0.2 | 0 | 0 | 0.1 |
| Bulk density packed pounds per cubic foot | 68 | 83 | 120 | 85 | 2.5 |
| Water Adsorption | 0.3 | 0.3 | 2.0 | 15-25 | 330 |

Activated aluminas having the gamma crystal structure are also very useful as optional inclusions in the starting material. Types of activated gamma aluminas which are useful include those conventionally sold for use in desiccants, catalysts, and chromatographic materials. For special products, a particularly valuable gamma alumina is a finely divided alumina which is made by a pyrolytic process and is a form of almost chemically pure alumina composed of well-defined particles of great fineness.

Still other types of alumina which can be included in the starting material are the so-called hydrated aluminas. Hydrated aluminas are white granular crystalline products with the chemical formula $Al_2O_3.3H_2O$ or $Al(OH)_3$.

Other hydrated aluminas useful as starting materials with the fibrous boehmite are those made according to processes disclosed in the following United States patents:

| | |
|---|---|
| 2,590,833 | 2,657,115 |
| 2,085,129 | 2,194,218 |
| 2,163,922 | 2,656,321 |
| 2,154,163 | 2,505,168 |
| 1,958,710 | 2,453,847 |
| 2,137,638 | |

Besides non-boehmitic aluminas, other valuable optional starting materials for use with fibrous boehmite in preparing products of the invention include clays, silica and silicates, feldspars, flint, magnesite, lime, dolomite, beryl, chromite, talc, beryllia, titania, zirconia, sillimanites, pyrophyllite, spodumene, graphite, rutile, and miscellaneous glaze and glass-forming materials including lead compounds (such as $Pb_3O_4$ and $Pb_2CO_3.(OH)_2$) zinc compounds including zinc oxide and zinc carbonate, boron compounds including boric acid or borax, and tin oxide ($SNO_2$).

For ceramic purposes clays are usually classified into three types—the kaolins, the ball clays, and the bentonitic clays. Colloidal anisodiametric boehmite can be used with these clays to make conventional ceramics. Other clays which can be used with fibrous boehmite include the so-called fire clays, the calcareous clays and the ferrogenous clays. Fire clays are hard and break with a conchoidal fracture and develop little elasticity even after grinding. However, mixed with fibrous boehmite they act as a grog (burned clay) and maintain the volume stability of such bodies as fire brick made from them.

More broadly, there can be used with the colloidal anisodiametric boehmite starting material a metal or a compound containing a metal, particularly metal oxides.

Examples of useful metals include copper, rubidium, silver, cesium, gold, beryllium, magnesium, zinc, strontium, cadmium, barium, mercury, radium, aluminum, scandium, gallium, yttrium, indium, lanthanum, thallium, silicon, titanium, germanium, zirconium, tin, hafnium, lead, vanadium, niobium, arsenic, antimony, tantalum, bismuth, chromium, selenium, molybdenum, tellurium, tungsten, manganese, rhenium, iron, cobalt, nickel, ruthenium, rhodium, platinum, osmium, palladium, iridium, all of the metals of the rare earths of group type 4f of period VI (of the periodic table) including cerium, praseodymium, neodymium, and all of the metals of the rare earths group type 5f of period VII (of the periodic table) including thorium and uranium.

The metal-containing compound can be of two types, that is, either a metal oxide or a compound of the metal oxide.

By the term "metal oxide" is meant compounds containing oxygen and at least one metal such as those listed above. The metal oxides useful with the boehmite as starting materials include all those metal oxides which yield alumina products in which such metal oxides present are insoluble in water.

By the term "insoluble" is meant no more than 0.1 weight percent of metal oxide (including $Al_2O_3$) passes into aqueous solution when the product is stirred in distilled water for one hour at 30° C. and the excess product is filtered off and the filtrate is analyzed for metal content.

The metal oxides useful as starting materials with fibrous boehmite in the present invention are those which are stable solids at temperatures up to 1000° C. and preferably up to 1500° C. for periods of up to four hours. Thus, the oxides commonly known as ceramic oxides are the preferred metal oxides. Certain other metal oxides such as lithium oxide, which is not high melting and which dissolves in water, is nevertheless insoluble in water when combined in the products of this invention, and are therefore included as useful in this invention.

Compounds of metal oxides are those compounds derived from two or more different metal oxides and metal oxide precursors with or without a non-metal oxide.

By "metal oxide precursor" is meant a compound containing a metal from which one can prepare by simply heating in air a metal oxide. Such a metal oxide precursor can be a material such as the metal itself or its carbonate, its sulfide, its nitrate, or even its hydrous oxide.

By "non-metal oxide" is meant oxides of elements which are commonly recognized as being non-metallic.

Non-metal oxides which may be combined with metal oxides or metal oxide precursors to produce compounds of metal oxides which are insoluble in water in the products of the invention include the oxides of boron and phosphorus. Carbon dioxide is a non-metallic oxide, but its compounds with metal oxides are generally too unstable at elevated temperatures to be particularly useful in the present invention. One class of compounds of metal oxides includes combinations of metal oxides with acidic non-metal oxides such as magnesium phosphate.

In general, compounds of metal oxides can contain anions such as phosphate, chromate, vanadate, sulfate, arsenate, selenate, molybdate, tungstate, uranate, manganate, niobate, titanate and silicate.

Sometimes very small amounts of the above-mentioned optional inclusions, say, less than 5 weight percent of the product, can be used as starting materials for products to be prepared by heating at higher temperatures, say, even above 1500° C. Thus, in making high-melting alumina ceramics, as little as 1% of magnesium oxide, calcium oxide, chromium oxide or other very high-melting ceramic oxides can be incorporated with advantage.

Other optional starting materials which can be used but which do not persist in the final products themselves include volatile and combustible (i.e., below 200° C.) inorganic and organic materials. Most common of these materials is, of course, water although certain organic compounds, especially liquids, are of value in the processes and products of this invention. Other volatile components are nitrogen oxides, as present in nitrates, carbon dioxide as in carbonates, organic waxes, binders and lubricants, such as waxes, gums and resins, either natural or synthetic.

In general, the starting materials of this invention will contain from 1% to 100% by weight of colloidal anisodiametric boehmite, and the ultimate alumina products will contain a similar proportion.

Processes of the Invention

As already pointed out above, the processes of this invention include the step of heating anisodiametric colloidal boehmite to a temperature in the range of 300 to 1000° C., whereby the boehmite is converted to a transition alumina, especially gamma alumina, without major change in the size or shape of the alumina particles. When the gamma form is desired it is preferred to heat in the range of 300 to 850° C. The step can be used to prepare anisodiametric colloidal aluminas, such as gamma, as novel primary products in such forms as powders, or it can be used in combination with a forming step, whereby the transition alumina is produced directly in the form of useful, shaped objects. The latter processes can be combined with a further heating step in which the transition alumina shaped objects are heated to a temperature above about 1000° C., whereby they are converted to alpha alumina without substantial change of physical shape or size.

By inclusion of optional additional starting materials as disclosed in detail hereinabove the shaped articles produced by the processes can consist of such other materials in addition to the transition of alpha aluminas.

The processes for making the shaped bodies include two principal modifications. In the first, one uses a plastic mass of anisodiametric colloidal boehmite containing at least some liquid such as water. In the other, one uses a dry, anisodiametric colloidal boehmite powder. Common to all routes, however, is the heating step in which a shaped object is heated under such conditions that thermal dehydration of the fibrous boehmite occurs, and the result is a shaped product which is coherent and contains alumina in the crystal form of gamma and/or theta and/or alpha.

When one uses the route involving a plastic mass of starting materials, the starting materials initially will either be in the form of a liquid dispersion containing fibrous boehmite or, insufficiently high concentration, a thick viscous body which can be shaped as a plastic mass directly.

The process consists of molding fibrous colloidal boehmite to obtain a porous body containing at least 95% of the pore volume as pores smaller than 100 millimicrons in diameter, and having a pore volume of less than 0.55 cc./g., as determined by nitrogen adsorption isotherms, and preferably less than 0.40 cc./g. Then the body is heated slowly to drive off volatile material such as water in the temperature range of up to about 250° C., then heated to from 300 to 1000° C. to convert to transition alumina, then heated to at least 1500° C. if desired, to convert the alumina to the alpha form and sinter the body to a density of more than 3.5 g./cc. and preferably more than 3.8 g./cc. It is important to heat the body uniformly throughout its mass at temperatures above 1400° C., to achieve uniform shrinkage, since distortion and cracking occurs if one part of a body shrinks before another part reaches the shrinkage temperature, which is between 1400 and 1600° C. If the body is in the form of a rod or ribbon, however, it may be moved very slowly and at a uniform rate through a temperature zone above 1400° C., to obtain a continuous shrinkage, or the zone may be moved past the body.

When one begins with a dry, fibrous boehmite powder, the powder must be dry-shaped under high pressure in order to obtain a coherent solid. In general, the pressure must be sufficient to produce a shaped article having sufficient coherency to maintain a fixed form for further processing.

If one adds water to a dry, fibrous boehmite powder, the fibrous boehmite swells and becomes a plastic mass. Water is hence preferred as a liquid to prepare plastic masses. In general, the only time one will use organic liquids in preparing products of the invention is when one desires to mix fibrous boehmite with a metal oxide, such as magnesium oxide, which is highly reactive with water. (Such metal oxides can serve as sintering promoters in the final heating step. Examples of other sintering promoters include manganese dioxide and titanium dioxide.) When one prepares such a mixture, one can press a water-free mixture of fibrous boehmite and magnesium oxide in the presence of an organic liquid as, for example, ethanol.

The most homogeneous structure is obtained by dispersing the fibrous boehmite in water, which separates the ultimate fibrils, and then shaping and permitting the mass to dry. In this case, there is great shrinkage upon drying, but if the hydrated mass is concentrated and has the consistency of a staff clay mass, it shrinks uniformly and with minimum cracking.

By mixing one part of colloidal boehmite powder with two parts of water, there is obtained a very stiff, clay-like, extrudable mass. It is made by adding the powder to the water while stirring with a dough mixer. A vacuum pug mill is preferred for preparing bubble-free stiff masses.

The consistency at different concentrations, with barium hydrate as an additive, was as follows:

25% water-dispersible colloidal boehmite powder+ 1.8% $Ba(OH)_2.8H_2O$—smooth translucent paste, like grease.

15% water-dispersible colloidal boehmite powder+ 1.05% $Ba(OH)_2.8H_2O$—semi-fluid paste.

10.5% water-dispersible colloidal boehmite powder+ 0.5% $Ba(OH)_2.8H_2O$—very fluid; can impregnate paper.

Without barium, the mixtures are much stiffer:

40% water-dispersible colloidal boehmite powder—extremely stiff mass, breaks when heated suddenly.

15% water dispersible colloidal boehmite powder+ 10% n-propanol—smooth, soft grease.

10.5% water-dispersible colloidal boehmite powder+ 7% n-propanol—fluid when stirred, sets to gel at once when still.

In making up heavy pastes, it is important to add all the boehmite powder rapidly to the water with fast stirring, and to mix well before the colloidal boehmite has become fully swollen. In this way, a uniform mixture is obtained which continues to thicken over a period of about 15 minutes.

Normal propanol thins out the mass and gives it a smooth, grease-like consistency. It also acts as a defoaming agent.

The stiff plastic masses have been extruded from a "grease gun" as "worms," cut into pellets, and shaped into ceramic rods. The extruded material will hold its shape if the boehmite concentration is over 30, preferably 35 to 45% by weight.

For most homogeneous structures free from air bubbles, it is preferable to first make a 5 to 10% sol of the boehmite in water. This is then deaerated by placing it in a vacuum flask, pouring a few mls. of n-propanol or n-butanol on the surface of the thick fluid, and applying a vacuum. The alcohol stops the foaming, which otherwise makes deaeration almost impossible. The vacuum should be high enough to cause the mixture finally to boil.

On a small scale, this sol is most easily concentrated by pouring it into a cellophane sausage casing (dialysis tubing) and hanging it in the air to dry. As the volume decreases, the mass is squeezed toward the bottom to keep the tubing expanded. A 10% sol is readily concentrated to a 30% mass in one day. Concentration may be effected on a drum-dryer, removing the plastic material before it is fully dried, but evaporation from an open container is exceedingly slow, since the mass is too thick to be heated rapidly and uniformly, and almost impossible to stir.

Extrusion is carried out with the type of equipment used for clay. However, it is important to support the extruded material properly to prevent cracking. A rod on a solid support will shrink markedly during drying. But if it also adheres to the supporting surface, it cracks at intervals along its length as it dries. Extruded pieces should be hung from a support or laid on a hydrophobic surface to which adherence is minimal.

This problem is less marked with a 40 to 45% boehmite solid mass, since this is so hard and mechanically strong that it will shrink uniformly because of its high green strength. Such compositions can be extruded to coherent filaments as thin as a few mils.

Plastic, moldable masses of maximum solids content consistent with minimum viscosity or rigidity are obtained when the colloidal boehmite alumina is relatively free from flocculating counter ions, particularly traces of polyvalent organic or inorganic ions such as sulfate, oxalate, or the like. Such ions may be inactivated by adding small amounts of suitable metal salts which will precipitate the offending counter ion. Thus, sulfate ions may be neutralized by adding barium acetate, and oxalate ions may be inactivated by adding calcium acetate, in chemically equivalent amounts.

In some cases, where the colloidal alumina contains acetate ions, the viscosity of the highly concentrated aqueous dispersions may be reduced substantially by adding from 1 to 10% by volume of a lower alcohol, such as normal propyl or normal butyl alcohol. Small amounts of organic compounds of this type which tend to reduce the surface tension of water, are particularly useful for modifying the properties of the plastic or extrudable hydrated masses of fibrous colloidal boehmite, providing they are not ionic or cationic. However, long-chain anionic substances such as soaps, or flocculating materials such as polyvalent anions, should be avoided, since they thicken or precipitate the alumina dispersions.

Dry-pressed anisodiametric boehmite bars have been made directly from colloidal boehmite dispersible powder. One method is to dissolve a low-melting polymer of ethylene oxide in the boehmite sol and then freeze-dry the mass to obtain a boehmite powder mass which is then cold-pressed to coherent bars. By molding the boehmite as above, drying and heating to 500° C. in air to remove volatile matter and convert the boehmite to gamma alumina, and then hot-pressing the body in graphite molds under a pressure of 3000 p.s.i. at 1600° C. for half an hour, bars of alpha alumina are produced. Alternatively, the boehmite powder may be packed in the mold and heated slowly under pressure at such a rate as to allow escape of volatile material from the mold. In this case, the molded dense alumina is dark, due to inclusion of carbon from the decomposition of organic material usually found adsorbed on the boehmite.

Coherent shaped bodies may thus be molded from dry, fibrous colloidal boehmite by pressing the dry powder in a mold under a pressure of several tons per square inch, or preferably by making up a slightly moist mass of humidifying the fibrous colloidal boehmite powder and then pressing.

The particular procedure to be employed depends upon how strong the resulting body must be when converted to gamma alumina at, for example, 500° C., or after conversion to alpha alumina at 1200° C., or when sintered to high-density alpha alumina at, for example, 1600° C. In a preferred process for making a molded gamma body the greatest strength is obtained when the colloidal boehmite fibrils are disentangled and swollen apart in water, to form a sol, which is then deaerated and reconcentrated to produce a plastic, extrudable coherent mass, which can then be dried. Alternatively, the powder can be moistened and worked to a plastic mass in a vacuum pug-mill.

Slip-casting in a plaster mold can be carried out, but is slow as long as the alumina is present as colloidal boehmite; if the colloidal alumina has been converted first to gamma, theta, or alpha alumina, it may then be slip-cast, alone or preferably with other components such as clays or another alumina powder.

To summarize, the fibrous boehmite, whether in the form of a dry powder or a plastic mass, must be formed into a shaped body. This body is in turn heated or fired so as to convert the fibrous boehmite to gamma alumina and optionally, to alpha alumina. The means employed for forming the shaped body include molding, compressing, extruding, cutting (or carving), rolling, coagulating, and the like.

Molding includes forming, as by casting or the like, in or on a mold. Compressing includes compacting, as by pressure molding in or on a form or mold. Extruding includes forcing, pressing, or pushing through an orifice or die. Rolling includes shaping on a roller or rolling into a shape so as to form a sheet, a cylindrical body, or the like. Coagulating includes shaping masses into spherical, thread-like rodlike or other shape by causing the mass to be shaped to become a coherent, thickened congealed mass or clot. Thus, in the present mass a plastic mass of starting materials can be introduced into a fluid medium maintained at a sufficiently high temperature to drive off at least enough water to produce a true solid mass.

Those familiar with the art will appreciate that from a particular shaping technique, a particular type of product may be obtained. Thus, for example, in an extruding process, one will appreciate that there will be partial orientation or alignment of the fibrils present in the extruded product.

*Processes for Products Containing Metal Oxides and Alumina*

Compositions containing water-insoluble metal oxides and fibrous boehmite or gamma or alpha alumina derived therefrom, are made by methods involving a molding step.

(a) Fibrous colloidal boehmite powder may be ground with the other metal oxide components in the dry state, and pressed in a mold under a pressure of several tons per square inch.

(b) The above composition may be humidified or moistened before pressing.

(c) The colloidal boehmite may be converted to gamma, theta, or alpha by heating, then mixed with the other components.

(d) The boehmite, gamma, theta, or alpha may be mixed with precursors of metal oxides such as metal acetates, nitrates, formates, chlorides, carbonates, or other water-soluble or finely divided metal derivatives which are converted to metal oxides when heated above 350° C.

(e) The colloidal boehmite may be mixed with a water-soluble metal salt and then the boehmite and metal hydroxide or hydrous oxide coprecipitated and separated from the aqueous phase, dried and heated.

In all the above cases, the compositions are shaped or molded after they have been dried at least to the point where the mass is no longer fluid.

After the shaping operation, the shaped article may be dried. In this drying step, one removes sufficient water to permit heating of the shaped article to temperatures in excess of 100° C. without cracking or deterioration of the shaped article due to formation of appreciable quantities of steam. The step should be conducted at temperatures and pressures below the boiling point of the free water of hydration. It should lower the free water content of the shaped article to below 10 weight percent and preferably below 5 weight percent.

Following the drying step, there is a heating step. The heating step is usually conducted at temperatures in excess of 350° to produce gamma alumina and temperatures of about 1000° or above 1100° C. to produce theta and alpha alumina, respectively. Pressures employed are usually atmospheric, but pressures larger or smaller than atmospheric can be used.

The rate of heating is generally slow, and is slower the larger the shaped mass. Slow heating permits diffusion and escape of water vapor from the fibrous boehmite as it undergoes thermal dehydration. Thus, heating is done initially at a rate slow enough to avoid cracking of the shaped article being heated, as, for example, from 30° C. to 500° C. over a period of from 1 to 24 hours, depending on the size of the body, the temperature being raised at a uniform rate.

It is most important to avoid cracking while gamma alumina is being formed. Thus, one heats the shaped article slowly at temperatures in the range of 350° C. to 450° C. until gamma alumina is formed and dehydration of the fibrous boehmite is more or less complete. In the case of sheets 1/16" thick, the temperature may be raised steadily from 350° to 450° C. over a period of 30 minutes, but with pieces six inches in thickness a period of two days is safer. Thereafter, one can heat the shaped article, if desired, quite rapidly to more elevated temperatures, even at temperatures in excess of 1100° C., without any particular undesirable side effects.

Conversion of transition alumina to alpha aluminas is accompanied by sintering and shrinkage. In order to avoid distortion of shaped articles, it is important that this shrinkage be brought about in a uniform manner.

Preferably, this sintering step is done slowly and uniformly in order to avoid any cracking or disintegration of the shaped body.

When pressed into a test bar at room temperature, fibrous colloidal boehmite forms a coherent, relatively strong, yet porous mass that has a linear coefficient of thermal expansion of $13 \times 10^{-6}$ inches/inch/° C. in the range of 30° C. to 250° C. This molded mass of colloidal boehmite begins to shrink when heated in air to 250° C., and more rapidly in the range of 250 to 450° C. as it is transformed to gamma alumina—but the total linear shrinkage during this conversion is only 2.5%. This means that a conversion from boehmite to gamma alumina is carried out with only minor change in dimensions or shape of the body.

When boehmite has been converted to gamma alumina, the coefficient of thermal expansion is then $8.7 \times 10^{-6}$ inches/inch/° C. in the range 30–500° C. Gamma alumina, in the form of a compact bar, shrinks irreversibly and regularly about 1.5% in linear dimensions while being heated from 600° to 1000° C. Thus, up to 1000° C., porous ceramic bodies prepared from fibrous colloidal boehmite do not markedly change in shape or size. At about 1000° C., the gamma changes to theta alumina with some further shrinkage, but this is difficult to distinguish from the further shrinkage as the theta is further and almost simultaneously converted to corundum or alpha alumina.

The sintering of alpha alumina above 1400° C., is attended by a shrinkage of up to 45% by volume. The remarkable thing is that this shrinkage of the composition of the present invention is uniform and complete, making it possible to produce strong, dense alumina bodies at only 1400° C. without hot pressing or going to such high temperatures that a coarse-grained product is obtained. The coefficient of expansion of the alpha alumina so produced is about $7.5 \times 10^{-6}$ inches per inch per ° C. between 30° C. and 500° C.

*The Novel Products*

Compositions of this invention include (a) transition aluminas, especially gamma alumina, in the form of anisodiametric, colloidal particles, and (b) porous shaped, strong, coherent bodies containing anhydrous crystalline alumina derived from colloidal anisodiametric boehmite by thermal dehydration, and (c) porous, shaped, coherent bodies containing aluminum compounds formed by thermal interaction of another metal oxide and alumina derived from colloidal anisodiametric boehmite by thermal dehydration. The aluminum compounds of (c) are, for example, aluminum silicates and metal aluminates, such as spinels of the types $MgO.Al_2O_3$ and $NiO.Al_2O_3$.

Since the transition aluminas, and especially the gamma aluminas, have the particle size and shape of the anisodiametric, colloidal boehmite particles from which they are derived by the thermal dehydration reactions above described, it follows that all of the size and shape descriptions given for the boehmite including those given in Bugosh Patent 2,915,475 apply also to the transition aluminas. The novel fibrous gamma alumina, for example, has at least one dimension in the colloidal size range of 1 to 150 millimicrons, an axial ratio of at least 3:1 and preferably at least 20:1, and are in the shape of fibrils preferably having a diameter in the range of 3 to 10 millimicrons.

In products of above class (b), metal oxides may be spread over the surface of the pores or may be in chemical combination with said surface, as in catalyst compositions. In the shaped, porous, coherent bodies of this invention, metals in the metallic state are present principally in the pores of the structure or deposited in particulate form on the surface of said pores and are not embedded and surrounded by the non-metallic alumina-containing matrix.

In the porous, coherent, shaped bodies there is present from 35 to 100% by weight of metal oxides, of which alumina derived from colloidal anisodiametric boehmite is one. Such alumina may be present as one or more of the crystalline forms of aluminum oxide or in chemical combination with another metal oxide.

For the most part, said compositions will contain over 95% by weight of metal oxides including alumina. The remaining 65% or 5%, respectively, of the above compositions can consist of metals, as in the catalysts of this invention. A preferred composition of this invention is a shaped, porous, coherent composition consisting 100% of metal oxides and containing from 1% to 100% by weight of aluminum oxide derived from colloidal anisodiametric boehmite.

It is a characteristic of the shaped bodies of this invention that they are porous solids. Porosity may be determined in a number of ways, but the commonest one is that employed in the ceramics industry, whereby the solid object is boiled in water, excess water is blotted off, and the gain in weight due to the water absorbed in the pores is measured. The pore volume of the shaped bodies may range from 0.1 cc./g. to about 0.8 cc./g., depending upon processing and additives.

It will be remembered that the porous masses are in the form of "shaped" bodies. That is, they are in the form of molded, coherent masses as distinct from the form of a powder such as, for example, might be obtained by grinding a solid. Thus, the bodies can consist of porous blocks, sheets, rods, fibers, pellets, granules, flakes, and, in fact, any of the shapes in which ceramics, catalysts or adsorbents are normally prepared.

By "coherent" is meant that the body will support its own weight at atmospheric pressures and room temperatures without becoming distorted. To be more specific, it will have a modulus of rupture of at least 10 pounds per square inch. However, most of the bodies of this invention have a modulus of rupture as determined by standard ASTM procedures for ceramics, of at least 100 pounds per square inch, and many of them have a modulus over 1000 pounds per square inch.

Concentrated moistened masses of fibrous boehmite containing perhaps 40 weight percent of water in which the fibrous boehmite is dispersed are generally sufficiently rigid so that when they are extruded into rods, for example, ¼ inch by 3 inches, such masses will support their own weight without appreciable deformation or change in form when suspended horizontally from its ends. In general, coherent products of the invention have appreciable mechanical strength. Extruded filaments, as small as a few mils in diameter, are strong enough to be wound on a bobbin.

The shaped bodies of this invention have novel properties of high porosity and high strength, as compared to similar compositions made with such other forms of alumina as non-fibrous colloidal alumina. The colloidal anisodiametric character of the boehmite starting material permits the formation of structures having a unique combination of high porosity and high mechanical strength. Analogous compositions may have high strength with low porosity or high porosity with low strength, but not the balance of these two properties found in the shaped bodies of this invention.

An important point that must be appreciated is that the boehmite is converted to transition alumina without major change in the size or shape of the particles. This is unexpected, particularly in the case of colloidal particles, and accounts for the unusual properties of the compositions of this invention. While sintering occurs at higher temperature as gamma is converted to theta and thence to alpha, there nevertheless persists a continuity of structure such that the porosity of these high-temperature forms and their coherence is directly traceable to the fibrous nature of the gamma from which the higher temperature forms were derived.

Preferred products of this invention are molded, porous compositions containing from 1 to 100% of alumina derived from colloidal anisodiametric boehmite, and from 99 to 0% of water-insoluble, thermally stable (not decomposed at 350° C.), high-melting (melting point over 350° C.) metal oxides. The metal oxides added must at least be stable enough to persist after the mixture has been heated to above 350° C. to convert boehmite to gamma. An even more preferred class contains over 50% by weight of alumina derived from fibrous colloidal boehmite, and especially preferred is a composition which is 100% alumina derived from anisodiametric colloidal boehmite.

Another specific, preferred composition comprises fibrous gamma alumina thermally derived from fibrous boehmite, together with chrysotile asbestos; this composition is obtained by heating the felted composition of U.S. Patent 2,917,426, issued December 19, 1959, to John Bugosh, above about 350° C. or by heating molded bodies derived from mixtures and plastic compositions of boehmite and asbestos as described in Serial No. 856,158, filed November 30, 1959. Another specific compoistion is similar to the foregoing, except that glass fibers with a softening point of over 1000° C. are used in place of asbestos.

Another specific, preferred composition is fibrous gamma alumina in intimate combination with catalytically active oxides such as oxides of silicon, chromium, molybdenum, copper, vanadium, nickel, cobalt, iron, platinum and platinum group metals. Another preferred composition is identical with the foregoing, except that the alumina derived from cololidal boehmite is in chemical combination with one or more of the other metal oxide components, as, for example, in a spinel.

Some of the porous, coherent bodies of this invention are particularly useful as intermediates in making very strong, dense, non-porous porcelains. Porous, coherent bodies which consist entirely of alumina derived from colloidal boehmite, are of great value as intermediates for making exceedingly strong, completely crystalline, non-porous objects of alpha alumina or corundum, as already noted.

*Pure, Dense, Crystalline, Alpha Alumina Bodies*

An important derived or secondary product made by processes of this invention is a dense, crystalline body of alpha alumina made from colloidal boehmite. Such a body contains from 98 to 100 weight percent of crystalline alpha alumina, the balance being a non-siliceous metal oxide, said body being prepared by heating a porous, shaped, coherent body of the invention to a temperature in excess of about 1400° C. until said body reaches a density, measured at room temperature, in excess of 3.8. This product is microcrystalline, having an average grain diameter less than 10 microns, with less than 10% by volume in the form of grains larger than 10 microns. The most preferred product has an average grain diameter less than 3 microns. The grain size is determined by examining cut and polished sections of the material by methods commonly used in metallurgy and in examining minerals, as, for example, by the metallurgical or petrographic microscope.

Conventional alumina powders cannot be sintered, after molding, to a dense body at a temperature of 1400° C., whereas properly densified bodies of colloidal boehmite can be sintered to within 95% of theoretical density under these conditions. The process is thus unique; the product of the process is also novel. The product differs from dense alumina bodies prepared from conventional corundum powders by hot pressing or sintering a slip-cast corundum powder at 1800° C., by having a finer grain size and greater inherent strength.

The basis for this distinction is the fact that under a pressure of several thousand pounds per square inch, at 1700° C., grain growth of alumina occurs rapidly, and conventional dense corundum or alpha alumina bodies cannot be made with a grain size smaller than about 10 microns. Thus, when subjected to high pressure at these temperatures, macrocrystalline alpha alumina ceramics are produced, with average grain sizes of upwards of 25 microns. On the other hand, by starting with colloidal components, one can produce alpha alumina ceramics at remarkably low temperature, with small grain size and therefore high strength, since one starts with a raw material having a particle size which is much smaller than the final grain size of less than 10 microns and preferably less than 3 microns which is characteristic of our products.

This particular derived product of the invention is a dense, essentially pure crystalline alumina body, and should be distinguished from alumina porcelain, which may contain as little as 75% alumina and contains a glassy phase.

The basis for this distinction is as follows:

Pure alumina is a ceramic material which is essentially all crystals, and contains no glassy phase. High alumina porcelains, on the other hand, although they may contain up to 95 or even 98% alumina, still contain additives, particularly silicates, usually added in the form of clay, which form a vitreous or glassy phase which bonds the alumina crystals together. This simplifies fabrication, and promotes sintering to high density at more moderate temperatures, but the glassy phase is still the weak point of the structure. On the other hand, with more than about 98% alumina, and with no appreciable amount of silica to form a glassy phase, strong, hard ceramic bodies are produced for industrial use. This form of pure, dense corundum is the strongest and hardest material known today for use at elevated temperature.

The designation "pure" alumina body must be further explained. The term is used in the sense that the alumina body is free from vitreous phase. This can be determined by sectioning the specimen, by using known mineralogical techniques, and examining the grain structure to see whether there is any amorphous, glassy phase lying between the grains. It is very difficult to make alumina so pure that there will be insufficient traces of foreign materials to form traces of glassy phase. However, when the alumina is more than about 98% pure, most of the corundum crystals are in direct contact and there is not enough glassy phase to prevent inter-granular bonding, even if some silica is among the 2% of impurities.

It should be understood that small amounts of other oxides which do not tend to form glass, such as magnesium oxide or barium oxide, which form crystalline phases with alumina, may be added in quantities up to 2%. Preferably, however, these alumina bodies of the invention contain more than 98% alumina, and preferably more than 99.5%.

High Alumina Ceramics

Other derived compositions of this invention are not pure aluminas derived from fibrous colloidal boehmite as described above, but are shaped, porous bodies containing, in addition to the alumina, one or more metal oxides other than alumina. "Metal oxides" will be understood to include compounds formed from two or more oxides.

The metal oxides admixed with alumina, in these compositions of this invention, are insoluble in water. Thus, the compositions of the invention do not contain free sodium oxide, for example, since uncombined sodium oxide is soluble in water; however, it may contain sodium oxide in insoluble, chemically combined form, such as in water-insoluble sodium aluminosilicates. The reason for this is that many of the preferred compositions of this invention are made by mixing metal oxides or metal oxide precursors with colloidal anisodiametric boehmite alumina in water and heating, and after the heat treatment, the products are essentially insoluble in water.

The procursors of the metal oxide which may be employed in making compositions of this invention may, however, be soluble in water. Thus, for example, one excellent way of making a shaped, porous alumina body of this invention comprising nickel oxide and gamma alumina, suitable for use as a catalyst, is to impregnate fibrous colloidal alumina in the form of powder with nickel nitrate, or to mix a colloidal dispersion of fibrous colloidal boehmite with a solution of nickel nitrate, and add sufficient ammonium hydroxide to precipitate nickel hydroxide along with the alumina, then separating the precipitate, drying and heating to 500° C.

Characterization of the Novel Products

The secondary products of this invention are characterized by containing the alumina phases, derived from colloidal fibrous boehmite, which remain distinct in the final structure as evidenced by the porosity, or in the case of the dense products, by having an unusually fine or oriented grain structure. Generally speaking, if other components are present which react with the alumina, converting it to other compounds, or if the temperature is higher than necessary to sinter the product to 100% density, then the product is characterized by the smaller grain size and greater strength.

The shaped bodies may range from isodiametric bodies such as cubes, spheres, cylinders, tetrahedra, and the like, to bodies which are sheet-like in nature in the form of films, plates, ribbons, or they may be extruded into rods or spun into exceedingly fine filaments, depending upon the mechanical stresses which are to be applied, the degree of flexibility required during use and the nature of the impregnation and activation steps. The particles may be molded in the form of extremely small spheres, for example, by gelling very fine droplets of concentrated aqueous dispersions of fibrous boehmite alumina, so as to produce a spheroidal particle as small as a few microns in size, up to several millimeters in diameter. These are converted to gamma alumina by suitable heat treatment.

The anisodiametric shape of the particles of the starting component of the invention makes possible a wider range of shapes and more tenuous, porous and spongelike structures than is possible with previously available forms of alumina. The latter tend to crack, craze, or simply to fall apart to a powder unless compacted under high pressure or bonded with a foreign bonding agent. It is characteristic of anisodiametric, and especially of fibrillar, colloidal particles that they intermesh and matt together to form an open, yet coherent and continuous network, exhibiting far greater strength than can be obtained from isodiametric particles of alumina, and thus can be used alone as a catalyst or catalyst support, or may be used as an alumina binder for other alumina powders which, by themselves, will not form coherent masses.

To summarize, one can utilize colloidal anisodiametric boehmite in the manufacture of a number of different types of coherent, shaped alumina-containing bodies. For purposes of description, however, these products containing alumina and the crystal forms gamma or alpha are divided into five types, as follows:

(a) Bodies containing substantially all gamma alumina derived from colloidal boehmite.

(b) Bodies containing substantially all alpha alumina derived from colloidal boehmite.

(c) Bodies containing alumina in the crystal form of gamma and/or alpha alumina derived from fibrous boehmite and in addition alumina derived from sources other than colloidal boehmite.

(d) Bodies containing alumina in the crystal form of gamma and/or alpha alumina derived from colloidal boehmite and non-aluminiferous materials.

(e) Bodies containing gamma or alpha alumina derived from colloidal boehmite, gamma or alpha alumina derived from sources other than colloidal boehmite and non-aluminiferous materials.

At 350° C. the fibrous boehmite is transformed into fibrous gamma alumina in about twenty-four hours or a somewhat shorter period at atmospheric pressure or moderate steam pressure. At 450° C. the transformation of fibrous boehmite to gamma alumina at atmospheric pressure is completed in a matter of a few minutes at atmospheric pressure. It is apparent that the minimum temperature of dehydration to gamma alumina is not an extremely sharp one but broadly speaking, about 350° is a practical borderline, with 300° C. being the minimum. For example, at 250° C. there is no appreciable decomposition of fibrous boehmite in a period of twenty-four hours. Colloidal boehmites of very high specific surface area, such as over 350 square meters per gram, are dehydrated rapidly at 350° C., for example, in a few hours, while those with low specific surface area, such as 100 square meters per gram, are dehydrated quite slowly at 350° C. and may require over a day.

The exact crystal structure of gamma alumina is a matter of debate. In general, gamma alumina is characterized by an X-ray diffraction pattern having the following spacings and line intensities:

| d Angstroms | I Relative Intensity |
| --- | --- |
| 2.7 | 2 |
| 2.41 | 6 |
| 2.28 | 6 |
| 2.18 | 2 |
| 2.09 | 1 |
| 1.98 | 10 |
| 1.95 | 6 |
| 1.54 | 2 |
| 1.39 | 10 |
| 1.14 | 3 |
| 1.04 | 1 |
| 1.00 | 1 |

Fibrous gamma alumina-containing bodies have heretofore not been known and have a variety of new and unusual properties, particularly as affects their ability to form ceramics and catalysts. Theta alumina is one of the higher-temperature forms of transition alumina. It is most readily formed at temperaturees above about 900° C. and below about 1000° C. Theta alumina is a transient material and is formed from gamma alumina in a period of about half a day or so, at about 1000° C. However, by the time a body has been converted largely to theta alumina, a small amount of alpha alumina will usually begin to appear as shown by the X-ray diffraction pattern. Thus, at about 1100° C. after a few hours, theta alumina is converted substantially entirely into alpha alumina.

Alpha alumina is formed by heating a fibrous boehmite about 1000° C., for example, at 1300° C. At this temperature, alpha alumina appears to be produced directly by a thermal dehydration of fibrous boehmite, possibly because the gamma and theta forms change to alpha as fast as they are formed. At from 1505° C., to 1300° C., one obtains an alpha alumina which is highly porous. Published literature on alpha alumina suggests that it cannot be prepared with a specific surface area of more than 3 or 4 m.$^2$/g., but by converting a fibrous boehmite to theta alumina and then to alpha alumina at minimum conversion temperatures (say, about 1050° C.) one obtains a porous alpha alumina body with a specific surface area of the order of from 10 to 50 m.$^2$/g.

It will be noted that alumina products of very diverse characters can be derived from the same raw material—namely, anisodiametric colloidal boehmite. When the boehmite used is a light, fluffy powder, which forms colloidal dispersions when mixed with water, it is converted directly to a highly porous gamma, theta, or alpha alumina, by heating at a series of increasing temperatures ranging from 350° C. up to about 1600° C. Because of the anisodiametric character of the ultimate particles, this porous character is carried through to the final product.

By forming a colloidal dispersion of colloidal fibrous boehmite alumina so as to produce a homogeneous distribution of boehmite fibrils throughout an aqueous medium, and then concentrating this aqueous mixture, a hydrated plastic mass is produced in which the boehmite fibrils are all interlocked or homogeneously interdispersed, so that when the mass is dried a coherent, homogeneous film or sheet or layer of alumina is obtained, having a density of about 1.4 g./cc. This can be converted at 500° C., for example, into the gamma form, and then, by virtue of its uniformity of pores, can be shrunk to dense alpha alumina directly, by heating at 1600° C. Alternatively, colloidal anisodiametric, but not necessarily fibrous colloidal boehmite powder may be pressed in a mold to a density of about 1.5 g./cc. This is then heated as described above.

The homogeneity of this mass of anisodiametric or fibrous mass of particles, particularly in regard to the absence of large pores and the presence of many pores having a diameter no more than about twice that of the original particles involved, makes it possible to produce a sintering action at high temperature, whereby the whole mass shrinks uniformly with elimination of all the voids, to produce a dense, molded replica of the original colloidal boehmite casting.

Thus, for the production of a dense, pure alpha alumina body, it is essential that the particles of colloidal boehmite, and consequently those of the gamma alumina derived therefrom, be packed together in as dense and homogeneous a fashion as possible, and then that the water be removed in such fashion as to minimize the formation or any macroscopic cracks or crevices with the result that the molded body shrinks uniformly in all directions and forms a coherent replica of the original mass. The molded boehmite body consists of a mass of boehmite particles which is about 50% porous, by volume, yet within these pores, the pore diameters are, on the average, no greater than approximately the diameters of the boehmite fibrils. In preferred boehmite bodies, these pores are smaller than 100 millimicrons in diameter.

If the colloidal boehmite fibrils are too short or the particles are not sufficiently anisodiametric, they do not interlock and give the desired coherent molded body. If the particles are too long, they do not pack well and give a brush-heap structure which is difficult to compact to maximum density in molding. Generally speaking, for dry-pressing, anisodiametric particles of low ratio of length to width are preferred. For extruding as a wet mass, or for casting as a coherent film, fibrous particles of high ratio of length to breadth is preferred. However, satisfactory dense alumina products can be made by using suitable pressing methods. Dehydration of the colloidal boehmite, as a powder, to gamma alumina, before dry-pressing, is preferred in the case of longer fibrils.

*Grain-Growth Inhibitors and Sintering Promoters*

It is possible to produce products having special characteristics by using additives of various kinds in combination with fibrous boehmite. Addition of such materials as manganese oxide, iron oxide, copper oxide, and titanium dioxide to fibrous boehmite alumina gives powders which can be molded and sintered to dense, strong, high alpha alumina bodies at temperatures as low as 1400° C. to 1500° C. Addition of grain growth inhibitors, such as cobalt oxide, magnesium oxide, chromium oxide, or nickel oxide to fibrous boehmite alumina gives powders which can be molded and sintered to dense, strong bodies composed of unusually fine grains of alpha alumina. Use of such additives with fibrous colloidal boehmite alumina gives unexpected results because of the unusual reactivity of the original boehmite employed.

The use of known sintering promoters in combination with boehmite alumina gives materials which can be pressed and sintered to density at temperatures several hundred degrees below those required with conventional alumina powders containing the same additives. Similarly, the use of known grain-growth inhibitors with fibrous colloidal boehmite alumina gives powders which can be pressed and sintered to dense, alpha alumina bodies with individual grains of alpha alumina having a maximum dimension of less than one micron. This is not possible using the same grain-growth inhibitors in combination with conventional alumina powders.

A discussion of grain-growth inhibitors and sintering promoters for alumina powders is presented by Cahoon and Cristensen, in Journal of the American Ceramic Society, 39, October 1956, page 343. These agents have the same general effects when used in combination with fibrous colloidal boehmite alumina; however, because of the unusual nature of this type of alumina, these effects are greatly accentuated. Those materials which are most effective as grain-growth inhibitors include magnesium oxide, cobalt oxide, chromium oxide, and nickel oxide.

Amounts of these materials as low as 0.1% effectively limit the grain size of dense, high alumina ceramics prepared from fibrous boehmite alumina powder. Levels as high as 10% are useful, but amounts in excess of 10% are undesirable because they alter the electrical resistance, thermal resistance and other desirable properties of the final sintered alumina body excessively. Graingrowth inhibitors in the level of 0.5% to 3% are preferred.

Preferred sintering promoters are iron oxide, manganese oxide, copper oxide, and titanium dioxide. These specific promoters are preferred over siliceous materials because they do not form glasses when mixed with pure alumina; however, small amounts of amorphous silica are also useful as sintering promoters for colloidal fibrous boehmite alumina. As much as 20% by weight of these various sintering promoters can be added to lower the sintering temperature required in fabricating dense, high alumina ceramics from fibrous colloidal boehmite alumina powders. Levels in excess of 20% lower the softening point and modify other properties of the resulting body to such an extent that they are undesirable. As little as 0.5% of the various sintering promoters is effective in reducing the sintering temperature required to prepare dense alumina ceramic objects from fibrous boehmite alumina powders by molding and sintering techniques; however, amounts less than 0.5% have little, if any beneficial effect in this regard. Preferred levels of sintering aids or promoters are from about 1% to 7%.

Various combinations of grain-growth inhibitors and sintering promoters can be used to obtain special effects. For example, fibrous boehmite alumina can be modified with small amounts of a known grain-growth inhibitor. Next, this so-treated product can be treated further with sintering promoters, dried, and sintered to a dense, high alpha alumina ceramic body at temperatures considerably below those required in the absence of the sintering promoter. The size of the individual alpha alumina grains present in the final body are unusually small.

Combinations of sintering promoters alone are often beneficial. For example, manganese oxide used in combination with amorphous silica additives are unusually effective in promoting the sintering of dense, high alumina ceramic bodies derived from boehmite colloidal alumina powders. Many other beneficial combinations will be apparent to those skilled in the art of fabricating dense, strong, high alumina ceramics.

It is believed that these unusual and unexpected results are obtained with fibrous boehmite colloidal alumina molding powders containing grain-growth inhibitors or sintering promoters because of the high reactivity of the type of alumina employed and because of the unique degree of uniformity with which the modifying agents can be introduced into such powders.

Since the fibrous boehmite particles can be completely dispersed in water and certain other solvents, it is possible to treat them in solution with soluble forms of the sintering promoters and/or grain-growth inhibitors, or with soluble precursors of these compounds. When such colloidal solutions are dried, the surface of each individual boehmite alumina particle becomes coated with the additive or its soluble precursor in molecular dimensions, and little, if any, excess additive will be present in locations other than on the surface of these individual boehmite fibrils. Thus, such agents are located in such a manner as to exert their maximum influence on grain growth and/or sintering, and harmful excesses of them are not concentrated in isolated areas to create zones of weakness in the final fired alumina ceramic body.

By surrounding the ultrafine colloidal fibrils of boehmite alumina with grain-growth inhibitors, these latter agents can exert their maximum effect, and grains of less than 1 micron in maximum dimension can be obtained in the fired objects. Similarly, location of sintering promoters of molecular dimensions at the surfaces of these highly active colloidal boehmite powders permits them to function much more effectively than in any other known combination with conventional alumina powders.

Elimination of the solvent from these modified colloidal dispersions of fibrous boehmite colloidal alumina can be accomplished by drum drying, freeze drying, spray drying, or other suitable means which does not involve removal of the modifying agent from the surfaces of the dispersed colloidal particles. The resulting powder can be shaped by conventional molding, or it can be moistened with a small amount of water and extruded to the desired shape. The shaped porous object can then be sintered to a relatively porous compact of gamma alumina by heating to the temperatures described earlier. This conversion involves only slight shrinkage, and coherent objects are obtained. This modified gamma alumina object can be further sintered to strong, dense, high alumina bodies composed of alpha alumina.

It is also possible to introduce the modifying agents by mixing aqueous dispersions of fibrous boehmite alumina with appropriate colloidal aquasols of the desired additive. By eliminating the solvent from such colloidally homogeneous mixtures, modified boehmite alumina molding powders are obtained which contain the desired additives in the same degree of colloidal homogeneity which existed in the original mixture of sols. This method of modifying fibrous colloidal alumina with grain-growth inhibiting substances or sintering promoters is particularly beneficial when soluble precursors are not readily available or convenient to use.

An example of the above-described technique is the modification of fibrous colloidal boehmite alumina with titanium dioxide, a known sintering promoter. In this case, it is advantageous to mix a colloidal aquasol of fibrous boehmite alumina powder containing about 4% solids with appropriate amounts of a dilute aquasol of colloidal $TiO_2$ particles in the rutile crystal modification. Elimination of the solvent by spray drying or freeze drying, for example, provides a modified alumina molding powder containing the sintering promoter, titanium dioxide, in a highly dispersed form.

Another method of introducing these grain-growth inhibiting and/or sintering-promoting substances is to impregnate a porous object of gamma alumina derived from fibrous colloidal boehmite alumina powder. For example, fibrous colloidal boehmite alumina powder can be molded or extruded to the desired shape, and fired at an intermediate temperature of about 500 to 800° C., to give a porous gamma alumina ceramic object with a high specific surface area, comparable to that of the original boehmite powder employed. This porous gamma alumina body is then soaked in an aqueous solution containing soluble precursors of the desired oxide modifier or, in some cases, in an aquasol of the desired modifying oxide. After this impregnation treatment, the porous object is dried, thus fixing the modifier on the surface of the individual gamma alumina particles in the porous compact. This porous compact can be sintered directly to a dense alpha alumina body, or it can be repulverized to give modified powders which can be processed as desired.

In certain cases, it is also acceptable to introduce the modifying agents by simply mixing dry, fibrous boehmite alumina powder with the desired additive. This method of introducing modifiers is less effective than those described above, and is primarily of usefulness for the introduction of sintering aids or promoters. Dry-milling appropriate mixtures can be employed, but it is more satisfactory to ballmill such mixtures in the presence of an inert liquid.

The modified colloidal fibrous boehmite alumina molding powders containing grain-growth inhibiting substances and/or sintering promoters can be converted to dense, strong, alpha alumina ceramic objects in any manner above described. In all cases, the benefits of unusually low sintering temperature and/or unusually fine grain structure are realized. One of the simplest methods of converting such powders to dense ceramic oxides is to mold the composition at approximately 10 tons per square inch in a steel die, and to sinter the molded object at temperatures from 1300° C. to 1700° C. in air. Special effects are realized by conducting this sintering operation under specialized atmospheres or conditions. For example, sintering in a vacuum provides translucent bodies, and sintering in a hydrogen atmosphere lowers the sintering temperatures required.

It is also possible to prepared dense alumina ceramic objects from such compositions by moistening the powder with approximately 60% water by weight, to produce a thick paste. This paste may then be extruded into rods, tubes, filaments, or other desirable shapes. These shaped objects can be dried and sintered to dense alumina objects under the conditions described above.

Such powders may also be hot-pressed to dense alumina ceramic objects. In the presence of the preferred grain-growth inhibiting substances, it is possible to conduct the hot-pressing operations at sufficiently high temperatures to obtain theoretically dense alpha alumina bodies composed of extremely fine grains of alpha alumina. Under these same conditions, conventional alumina powders undergo excessive grain growth. In a similar manner, molding powders comprised of colloidal fibrous boehmite alumina containing the preferred sintering promoters can be hot-pressed to dense, strong ceramic objects at temperatures considerably below those required with conventional alumina powders. In this manner, it is possible to reuse the molds or dyes, thus making hot-pressing alumina objects more economically attractive.

Compositions Useful as Ceramics

While the porous bodies of this invention are not as strong as conventional dense ceramics, they are useful intermediates for the production of dense ceramics. Thus, the porous shapes obtained by pressing gamma alumina derived from colloidal boehmite can be sintered at high temperature to produce dense, strong ceramics.

They can also be impregated, as with aluminum salts, before being fired, to improve the strength.

They can be impregnated with wax or resins, and used as insulating materials.

They may be employed as porous diaphragms in electrolytic cells and electric batteries, where a porous, rigid medium is needed to support and hold the electrolyte. A particular use, for example, is as a support for a small amount of aqueous electrolyte such as phosphoric acid to give a stable humidity gauge; the electrical resistance of such a body varies over a wide range with humidity.

As discussed more fully hereinbelow, these porous ceramic bodies are useful as catalysts, per se, or as supports for catalysts. The high stability and porosity of the porous alpha alumina bodies particularly favor their use as catalyst supports at high temperatures.

The porous, thin ceramic sheets can be cut into strips and laminated with a metal such as aluminum or copper, to give a gamma alumina-copper strip which has a greater distortion with temperature than ordinary bimetallic strips, and advantageously used in making thermostats.

The dense porcelain-like bodies of this invention are useful in all applications where conventional high-strength porcelains are employed. They can be used particularly for purposes of electrical insulation as in power-line insulators and sparkplugs. They can be employed as dinnerware and for chemical processing equipment.

The very strong pure alpha alumina bodies are valuable for making cutting tools, nozzles for high-temperature jets, dies for working metals and all uses where maximum strength at high temperature is required.

Compositions Useful as Adsorbents

Adsorbents for moisture or other vapors depend upon the presence of extremely fine, submicroscopic pores which, through their capillary attraction, remove the water or other vapor from gas streams, for example, or remove certain constituents which have an affinity for the alumina surface, from solution. For this type of use the formed bodies of this invention will generally have a specific surface area greater than 100 m.$^2$/g., but usually not over 500 m.$^2$/g. If the composition is made up essentially of alumina derived from fibrous colloidal boehmite, then the surface area of the adsorbent will generally be in the range between 200 and 400 m.$^2$/g.

In such adsorbents, the alumina derived from fibrous colloidal boehmite will be in the gamma form. Some X-ray evidence suggests that some of the alumina may be in the eta form, but the fibril diameter of the alumina is so small that it is difficult to tell from X-ray patterns whether the alumina is gamma or eta; the gamma and eta X-ray patterns differ principally in that the eta form shows a weak but characteristic line at about 4.55 A., whereas the gamma form shows only a broad band at this point. In the alumina derived from fibrous colloidal boehmite, the 4.55 line is generally a band, although, depending upon drying conditions and heat treatment, it may show some sharpening of the band into a line more characteristic of the eta structure. Therefore, hereafter, the alumina derived from fibrous colloidal boehmite in the temperature range from about 350 to 900° C., will be referred to as gamma alumina, since this term seems to be sufficiently broad to include the slight modifications which might suggest an eta structure. In any case, this dehydrated alumina may be classed as a transition alumina.

Compositions Useful as Catalysts

A pure alpha alumina catalyst base having a surface area of only a few square meters per gram, yet in a highly porous voluminous form, can be produced by shaping or molding fibrous colloidal boehmite, either by wet extrusion or cold-pressing a powder, and slowly heating it to a temperature of over 1000° C., and preferably over 1100° C., until the boehmite has been converted through the stages of gamma and theta, to alpha. If the temperature does not exceed about 1300° C., the body of alpha alumina, or corundum, is surprisingly porous. During this transformation from theta to alpha the surface area, as determined by nitrogen adsorption, diminishes drastically, but the shaped body does not shrink in proportion to the drop in specific surface area, so that the body contains a relatively high volume of wide pores. This type of material makes an excellent catalyst base for certain types of catalysts, particularly those employed in highly exothermic reactions, as in catalytic oxidations catalyzed by metal activators.

Some of the more important catalysts, for use not only in the petroleum industry but in other chemical process industries, in which fibrous gamma alumina catalyst bases can be employed to advantage, are as follows: In an extruded base re-forming catalyst, the use of fibrous colloidal boehmite which, in turn, results in fibrillar, microcrystalline, gamma alumina, yields bodies which, when extruded in the hydrated state, are stronger and tougher, do not crack upon drying, and exhibit remarkable strength when heated to activation temperature of about 500° C. Furthermore, due to the relatively large pores up to 15 millimicrons in diameter, sintering at elevated temperature, particularly in the presence of steam and during the regeneration when organic compounds are burned off the catalyst, is not as severe as in the more compact, denser catalyst bodies. The bodies of the present invention thus combine unique thermal stability at elevated temperature with excellent mechanical strength.

The shaped gamma alumina of fibrillar form, when modified during its formation by a small amount of colloidal silica, permits stabilization at elevated temperature with a minimum amount of silica. A mixture of aluminum hydroxide and colloidal silica of small particle size, when thoroughly co-mingled, dried, shaped, and fired at white heat, is converted promptly to an aluminosilicate. On the other hand, by first forming discrete fibrillar crystals of boehmite, mixing them with colloidal silica, and then forming the mass, a shaped body is obtained containing fibrillar gamma alumina. After it has been activated this body retains its activity and is stabilized, since there is little tendency for the silica and alumina to react, except at the surface of the particles.

In catalytic dehydrosulfurization reactions, it is important that the alumina-base catalyst used have a wide pore diameter. This catalyst, which is used for the removal of sulfur from crude oil and for hydrogen production, is advantageously made so as to contain fibrillar gamma alumina as above described because the pore diameter attained is wider without sacrifice of specific surface area.

The wide pores of fibrillar gamma alumina catalyst bodies makes it possible to activate them with a minimum quantity of platinum deposited throughout the surface of the fibrils, thus achieving maximum activity with minimum cost for the platinum.

Nickel oxide catalysts and nickel catalysts reduced therefrom, are advantageously stabilized by incorporation of fibrillar gamma alumina. Thus, colloidal nickel hydroxide is mixed with colloidal fibrillar boehmite alumina in suitable proportions to cause the nickel hydroxide to be deposited uniformly over the surface of the boehmite fibrils, but not in sufficient quantity to fill all the pores between the fibrils when the coprecipitated mass is filtered off as a gel and dried. Heating to drive off the water leaves a matrix of fibrillar gamma alumina with nickel oxide deposited regularly and uniformly over all the fibrils; it can be used as such or the nickel oxide can be reduced to metallic nickel, which then resides as fine crystals of colloidal size distributed over the surface of the alumina. Because of the wide pore diameter, diffusion of gases into and away from the nickel surface is rapid, and because of the alumina matrix, which is stable to at least 700 or 800°, these pores remain open and the surface area remains high.

An especially preferred type of catalyst base is a corundum porous body, having a sponge-like structure of interconnecting pores up to 1000 A. in diameter and relatively free from pores smaller than 100 A. in diameter, on the surface of which fibrous colloidal boehmite is deposited and converted to a thin layer of highly active, highly porous gamma alumina. By impregnating the pores of the corundum base with a colloidal dispersion of fibrous boehmite alumina in this fashion, then raising the pH with ammonia to gel and fix the boehmite within the pores, and finally heating the mass, it is possible to apply a lining of fibrillar gamma alumina to the internal and external surfaces of the macroporous alpha alumina or corundum body. The pores of the corundum body act as a mold for the colloidal boehmite alumina, which is thus deposited as a shaped lining.

The advantages, as catalysts and catalyst supports, of the alumina bodies of the present invention become apparent when it is realized that the fibrous colloidal boehmite permits one to form alumina gels of wider pore diameter than can be obtained by conventional means from conventional boehmite alumina gels. By starting with fibrous colloidal boehmite having fibril diameters of from 4 to 6 millimicrons, or 40 to 60 A., gels are produced having pore diameters ranging up to 150 A., or greater.

The fibrillar gamma alumina of this invention, which may have a specific surface upward of 200 m.$^2$/g. and usually about 300 m.$^2$/g., in the form of highly porous bodies traversed by wide pores and having nevertheless good mechanical strength, is an ideal base for the application of metal and metal oxide catalytic materials. In particular, for example, it is an ideal base for a platinum catalyst. The preparation and uses of such platinum-modified alumina catalysts, in which platinum is deposited in extremely active and finely divided form on an alumina catalyst base of high specific surface area, is described in considerable detail in U.S. Patent 2,838,375.

These catalysts are particularly useful for reforming hydrocarbons in the petroleum industry. The alumina base is made by substituting in the processes of said patent an aqueous dispersion of fibrillar colloidal boehmite alumina for an equivalent amount of aluminum hydroxide, based on $Al_2O_3$ content. The colloidal boehmite is coprecipitated with the other ingredients, very much like a conventional aluminum salt, except that much less base is required for precipitation.

Where pores of greater than 100 Angstroms in diameter are required, simultaneously with a relatively high specific surface area, the colloidal fibrous boehmite can be admixed with various alumina trihydrates, such as Bayerite, gibbsite, and Randomite, as described in said U.S. Patent 2,838,375. The fibrous boehmite not only provides an increased number of pores larges than around 50 Angstroms, but also the fibrous character of colloidal boehmite contributes to the mechanical strength of the resulting catalyst gel.

Another method of providing pores larger than 100 Angstroms in diameter, is to admix into the colloidal fibrous boehmite a certain amount of combustible or acid-soluble components in the form of rods or particles greater than 100 Angstroms in diameter, which can later be removed from the dried catalyst prior to or during activation. Thus, the incorporation of highly beaten glassine paper pulp, which burns out of the gell during activation in air, or extremely finely divided calcium carbonate, which can be dissolved out of the dried, activated gel, improves the porosity in regard to larger pores.

A wide variety of finely divided metals, metal oxides and metal compounds used in conventional cracking catalysts can be applied to the fibrous gamma alumina catalyst base to provide novel catalysts showing unusual activity. For instance, colloidally subdivided fibrous gamma alumina of this invention can be employed in catalysts and catalytic processes disclosed in the following United States patents:

| | |
|---|---|
| 2,847,358 | 2,886,515 |
| 2,849,377 | 2,898,388 |
| 2,486,361 | 2,415,061 |
| 2,854,403 | 2,422,172 |
| 2,858,268 | 2,790,015 |
| 2,756,188 | 2,804,426 |
| 2,772,217 | 2,810,698 |
| 2,700,639 | 2,879,225 |
| 2,760,910 | 2,879,226 |
| 2,718,535 | 2,882,217 |
| 2,687,987 | 2,882,221 |
| 2,695,886 | 2,882,245 |
| 2,707,700 | 2,894,898 |
| 2,724,683 | 2,813,081 |
| 2,736,684 | 2,861,037 |
| 2,745,812 | 2,861,942 |
| 2,670,322 | 2,863,822 |
| 2,677,648 | 2,668,142 |
| 2,677,649 | 2,450,776 |
| 2,474,440 | 2,485,927 |
| 2,864,875 | 2,572,110 |
| 2,870,083 | 2,483,130 |

All of the foregoing catalytic processes of the prior art can be carried out using as a catalyst a shaped body of fibrous gamma alumina as taught in the present disclosure. The improvements accruing from the use of the fibrillar gamma alumina or by making shaped alumina bodies starting with fibrous colloidal boehmite alumina, are related to the unusual physical form of the catalysts, which results in a combination of pore structure and mechanical strength not hitherto achieved.

To summarize, alumina catalysts similar to those of the prior art can be made in accordance with the teachings of this invention, and the shaped catalyst granules or particles, as made with fibrous colloidal boehmite or converted to fibrous gamma alumina, are products of the present invention. Production of an alumina body of sufficient purity for special catalyst applications, or the purification of formed or shaped alumina bodies by processes such as leaching with acids, ion exchange, or covering up of impurities by the deposition of further alumina can be employed.

The reactions which have heretofore been carried out on alumina catalysts or catalysts containing alumina may be carried out similarly on similar catalysts made with fibrous colloidal boehmite or fibrous gamma alumina according to this invention.

One can take an inexpensive, low-surface-area starting material, combine it with fibrous boehmite and obtain a high-surface-area, catalytically active product. This product can be used as a substrate to which are added activators or promoters. Non-porous carriers which can be used with fibrous boehmite include ground glass, aluminosilicates, silicon carbide and mullite. Such non-porous carriers are much improved with the addition of fibrous boehmite.

Porous low surface area carriers which can be advantageously combined with fibrous boehmite include diatomaceous earth, brick, polmuse, silicon carbide aggregates, porous metals, stainless steels and other sintered metal carriers including Monel, Hastelloy, and other alloys. Of course, carriers in this context refer to a material which itself is not catalytically active but which can be used as a substrate for catalysts containing alumina.

Other high-surface-area, non-porous carrier materials include kaolin, iron oxide pigments, carbon black, titania and zinc oxide. On these, fibrous boehmite can be deposited and processed for catalyst use as above described.

High area porous supports from natural products are obtained by processing (including washing, acid treating or calcining) bentonite, bauxite, halloysite, and attapulgite. Inorganic skeletal products for activation with fibrous boehmite for catalyst use can be obtained by heat treating crystalline hydrates or hydroxides to give a skeleton-type product having the growth structure of the original material although perforated by small pores—say, 50 Angstroms in diameter in the case of magnesia. In this way, alumina and magnesia catalyst products supports can be made.

Porous glass for activation with alumina from fibrous boehmite can be obtained by leaching of soluble constituents from a glass having the composition $SiO_2$ (50%) $Al_2O_3$ (10%) alkali metal hydroxide (5%), boria (20%), and $P_2O_5$ (30%).

Dry gel products for treatment with fibrous boehmite are obtained by drying hydrogels which result from the aggregation of particles. Gel type carriers can be prepared from oxides which form colloidal dispersions, such as titanium, silica, iron oxide, thoria, and the like.

All or part of the alumina in synthetic silica-alumina catalysts can be replaced with fibrous boehmite. Advantageous amounts of alumina partially or wholly replaced by fibrous boehmite range from about 13% to about 25 weight percent alumina.

Fibrous boehmite also improves the performance of re-forming catalysts of both the platinum-containing and non-platinum-containing types. For example, use of fibrous boehmite as a partial replacement of the alumina support in a platinum catalyst containing from 0.3 to 0.8% platinum metal and about 1% halogen as chlorine or fluorine improves performance. Fibrous boehmite alumina can also be used or substituted for all or a part of the alumina in molybdenum oxide-alumina catalyst, useful in the thermofor catalytic re-forming process. Fibrous boehmite alumina can also be substituted for all or a part of the alumina substrate in catalysts used for hydrogen treatment of petroleum fractions, and can be used, for example, in catalysts containing a mixture of cobalt and molybdenum oxides on an alumina support.

In order that the invention may be better understood, reference should be had to the following illustrative examples:

EXAMPLE 1

The raw material for the production of a ceramic body is a water-dispersible, colloidal fibrous boehmite, made by hydrolyzing basic aluminum diacetate in aqueous solution containing 4.5% $Al_2O_3$ in an autoclave at 160° C. for a period of 1 hour in the presence of an amount of ammonium sulfate corresponding to 1.25 moles of ammonium sulfate per 100 gram atoms of aluminum, the colloidal alumina so formed being then spray-dried, yielding a powder which is spontaneously dispersed with water to form a colloidal solution of fibrous boehmite.

This colloidally dispersible boehmite alumina powder contains 67.8% $Al_2O_3$, 13.4% by weight of chemically bound acetic acid, and has a specific surface area of 253 m.$^2$/g., as determined by the Brunauer, Emmett and Teller method. When dispersed in water at a concentration of 1%, 92% of the alumina remains in the sol in colloidal form, and does not settle out after prolonged standing.

This colloidal boehmite, which exhibits the X-ray diffraction pattern for boehmite, is mixed with twice its weight of water to obtain a viscous, clay-like mass, which is highly plastic and which is then extruded through a ¼" die to form stiff rods, which are placed upon a waxed paper surface, and permitted to dry at room temperature. Sections several inches long are fired to a temperature of 500° C., with slow increase in room temperature, over a period of 5 hours. The resulting rods of porous, gamma alumina, have a specific surface area of 256 m.$^2$/g., and a pore volume of 0.5 cc./g.

Then the extruded and partially fired, molded body is heated slowly over a period of four hours from room temperature to 600° C., and then in a vacuum induction furnace to 1600° C., and held at this temperature for two hours.

During this period of heating to high temperature, the molded body shrinks markedly, and finally forms a cylindrical shape, ⅛" in diameter. A measurement of the density by mercury displacement gives a value of 3.7 g./cc. A section of this ⅛" rod, 1" long, is so strong and tough that it can not be broken by hand. Furthermore, it can be dropped onto a plate glass surface from a height of 3 feet without cracking, and gives a metallic ring. Examination shows that the true density of the alumina is 4.0, and that the low value of 3.7 g./cc. is due to the presence of some large bubbles originally trapped in the extruded material, causing some voids or imperfections from 0.1 to 0.5 millimeter in diameter in the final body.

EXAMPLE 2

This is an example of the molding and conversion of a molded object of fibrous colloidal boehmite into a dense, strong ceramic product.

Fibrous colloidal boehmite, having a length to width ratio of about 20, a specific surface area of about 275 m.$^2$/g., consisting of fibrils around 5 millimicrons in diameter and 100 millimicrons long, is mixed, in colloidal dispersions, with an aqueous solution of high molecular weight polyethylene oxide known as "Carbowax," the ratio of "Carbowax" to alumina being about 0.3:1.0. This mixture is thoroughly stirred and then freeze-dried, to produce a light, fluffy powder containing the colloidal alumina and the "Carbowax," which serves as a lubricant for the forthcoming molding operation. This dry powder is then pressed in a mold to form a bar ¼" in diameter and 3" in length. It is then heated slowly from room temperature to 600° C. over a period of four hours, and held at 600° C. for one hour until all organic matter has been burned out. There is less than 5% linear shrinkage in the dimensions of the molded object at this point. The temperature is then raised to 1400° C. and held for one hour, during which time the bar shrinks 13% in length, and similarly in all other dimensions. At this point, the specimen consists entirely of alpha alumina in porous form, and it has a modulus of rupture, as tested by a transverse bending strength, of about 1400 p.s.i.

Then the bar is heated for 30 minutes at 1600° C., whereupon it shrinks to 67% of its original volume, all dimensions shrinking by an equal percentage. The product is a miniaturized replica of the original molded bar. The strength of the final product, which has a density of 3.5, is 17,000 p.s.i., modulus of rupture.

EXAMPLE 3

A ceramic bar is made exactly as in the above example, except that the weight ratio of "Carbowax" to $Al_2O_3$ is 1:10. The density of the product is 3.39 g./cc. and modulus of rupture 20,400 p.s.i.

EXAMPLE 4

A ceramic bar is made as in the above example, except that the ratio of "Carbowax" to alumina is 0.3:1.0, and the sample is finally fired for 1 hour at 1600° C. The density of the product is 3.6 g./cc. and the modulus of rupture is 10,000 p.s.i.

EXAMPLE 5

The following is an example of fibrous boehmite which is molded as a powder under pressure, and densified by heating under pressure in a mold at 1600° C.

A colloidally dispersible boehmite powder of the type described in Example 1 is placed directly in a graphite mold and subjected to a pressure of 4000 p.s.i. and heated over a period of 1 hour to a temperature of 1600° C. and held at that temperature for 30 minutes.

The resulting product, when cooled, has a density corresponding to that of alpha alumina, indicating that the percent by volume of porosity is no greater than 0.06%. This material, having a dark grey color due to slight contamination from the graphite walls of the mold in which the specimen is hot pressed, has a modulus of rupture (transverse) of 43,000 p.s.i. A similar sample heated for 30 minutes at 1700° C., has a modulus of rupture of 15,000 p.s.i., and proves to be much more highly crystallized. It is concluded that for maximum strength, this colloidal alumina must be molded at a minimum temperature that will permit densification to a non-porous state.

EXAMPLE 6

A colloidal dispersion containing 5% aluminum oxide is prepared from dispersible colloidal boehmite powder the sol deaerated by being subjected to sufficient vacuum to cause boiling of the water, and then the dispersion, now free from bubbles, concentrated by evaporation. For the latter purpose, the dispersion is placed in porous bags of regenerated cellulose which permits the mass to dry without becoming hard at any one point. As the sol evaporates, there is concentrated at the bottom of the container an extremely stiff plastic mass, containing 35% by weight of solids. This is placed in a cylindrical extrusion press fitted with a die 0.5 inch in diameter, and extruded into rods which are placed in wax paper, air dried, at which point its density is 1.4 g./cc., heated over a period of 3 hours to 1400° C. The porous alumina ceramic has a density of 2.06 g./cc., and a modulus of rupture of 1000 p.s.i.

EXAMPLE 7

The gamma alumina derived from fibrous colloidal boehmite, when made into a shaped porous form, is an excellent adsorbent. It has a nitrogen adsorption isotherm, for example, which may be characterized as follows, when made up as a paste with three parts of water per part of colloidally dispersible boehmite powder, extruded, dried and heated for 1 hour at 500° C.:

[cc. Nitrogen NTP adsorbed per gram of sample at boiling point of liquid

| Nitrogen | 115 | 170 | 310 | 320 |
|---|---|---|---|---|
| $P/P_0$ (partial pressure of nitrogen) | 0.5 | 0.7 | 0.9 | 0.95 |

The specific surface area of this sample of fibrous gamma alumina, which fibrous structure is observed by electron micrographs, is 256 square meters per gram and the pore volume is 0.51 cc./gram.

The adsorbent granules are easily shaped, for example, by making up a very thick plastic mass of 20% by weight of water dispersible fibrous colloidal boehmite fiber and 80% by weight of water, mixing these thoroughly to a dough-like consistency, removing air by subjecting the mass to vacuum with some vibration, then extruding the mass through a ¼" diameter orifice, to produce rods which are dried and broken up into granules, which, when dried and heated to 500° C., are essentially short cylinders having a cross-sectional diameter of about ⅛", the length depending upon how short they are broken up. These granules are extraordinarily hard and strong, and are much superior in mechanical strength to granules made, for example, by extruding a paste of aluminum hydroxide. Furthermore, the pore volume and pore diameters are considerably greater.

EXAMPLE 8

An adsorbent granule of even greater strength is obtained by mixing 5% by weight of chrysotile asbestos with the water-dispersible fibrous colloidal boehmite before making up the extrudable paste. Thus, for example, one part by weight of No. 3 short-fibered chrysotile asbestos is mixed with one part by weight of water-dispersible fibrous colloidal boehmite and added to 40 parts by weight of water. This mixture is then agitated in a high speed blender to obtain an intimate, highly dispersed mixture of asbestos fibrils and fibrous colloidal boehmite, following the general teachings of U.S. 2,661,288. Then 8 parts by weight of water-dispersible fibrous colloidal boehmite powder is added to the mixture, which is then further stirred, whereupon it becomes a very thick, heavy paste, containing thus about one part by weight of dispersed asbestos and 9 parts by weight of fibrous colloidal boehmite. This mixture is then extruded, dried and heated to 500° C. as before, and the absorptive characteristics determined. The strength of the granules is definitely greater than those made with the pure alumina as described above. In fact, the composition could be spread onto a smooth surface of waxed paper and permitted to dry, to give coherent sheets which are highly porous and with surprising mechanical strength in view of the high porosity. This makes it possible for the first time to use an adsorbent alumina in a sheet-like form, so that air or other gases may be blown through an absorption chamber between stacks of parallel sheets of the adsorbent with minimum resistance to flow. The absorption characteristics of this material are very similar to those of the pure alumina absorbent described above, the presence of the asbestos not appreciably diminishing the absorption capacity which is noted as follows by adsorption of nitrogen at the boiling point of liquid nitrogen:

| cc. $N_2$ adsorbed (NTP) per gram | 78 | 116 | 150 | 278 | 304 |
|---|---|---|---|---|---|
| $p/p_0$ | 0.3 | 0.5 | 0.7 | 0.9 | 0.95 |

The specific surface area is 237 square meters per gram, and the pore volume is 0.50 cc./g. This material absorbed 35% by weight of water at 90% relative humidity, and 9.8% at 50%, indicating a remarkably high effectiveness for reducing the moisture content of air from an uncomfortable to a comfortable range.

EXAMPLE 9

Still another type of adsorbent employs our fibrous gamma alumina derived from fibrous colloidal boehmite, primarily as a binder for other adsorbent materials, without detracting from adsorption capacity, since the binder itself is an adsorbent. Thus, 100 parts by weight of 10 mesh (per inch) granules of conventional activated alumina made by dehydrating alumina trihydrate is mixed with 100 parts by weight of a 15% dispersion of fibrous colloidal boehmite which is a viscous paste. The mass is pressed into a mold and dried, thus forming a coherent body which is then heat-activated for 1 hour at 500° C. in air.

It will be apparent that granules of the original alumina trihydrate may be mixed with the colloidal boehmite, shaped and then, after extrusion and drying, heated to 500° C., to convert the fibrous colloidal boehmite to fibrous gamma, while at the same time activating the alumina trihydrate by driving out the water and leaving the characteristic porous structure.

Silica gels may similarly be bonded together into granules. It is well known that silica gels have to be dried very carefully, in order to prevent severe cracking and disintegration into essentially a powder. Even finely granular silica gel may be bonded with alumina according to the process of this invention, to provide an absorbent for moisture, of high absorption capacity.

EXAMPLE 10

Fifty parts by weight of very finely crystalline sodium aluminum silicate zeolite, known as "Molecular Sieve" is moistened with water and drained on a filter. Then a viscous mass consisting of 20 parts by weight of water-dispersible fibrous colloidal boehmite mixed in a dough-mixer with 80 parts by weight of water, is mixed with 100 parts by weight of wet zeolite and deaerated by applying a vacuum. The mass is then extruded through a ½" diameter die into a wet, weak but coherent cylindrical form, which is dried at 110° C. in air and then heated to 350° C. in air to insolubilize the alumina and form a strongly bonded coherent granular absorbent.

EXAMPLE 11

The theta form of alumina is obtained by heating the shaped gamma alumina mass of Example 1. It can be obtained in the pure state only by careful control of time and temperature, which is determined by trial and error. The transformation can be followed by X-ray diffraction patterns. Thus, it is possible to obtain a shaped, porous, coherent body of theta alumina, essentially free from the original gamma form and not yet transformed appreciably into the alpha form. Such a composition, made by heating a wet, extruded and air-dried sample of fibrous colloidal boehmite for 16.5 hours at 1000° C., has the following characteristics. It has a porosity of 0.5 cc. per gram, as determined by absorption of water, and a specific surface area of 30 m.²/g. It is a coherent body having a modulus of rupture of 200 lbs. per square inch.

EXAMPLE 12

Nickel hydroxide in colloidal state of subdivision is made by dissolving 58 grams of $Ni(NO_3)_2 \cdot 6H_2O$ in 4 liters of water and adding 21 cc. of ammonium hydroxide (28% by weight of $NH_3$) suddenly and with rapid agitation. The precipitate is allowed to settle, is separated, placed in a cellulose dialysis bag and dialyzed in 4 liters of distilled water at 100° C. for 3 days, changing the water each day. The precipitate settles in the dialysis bag to a volume of 320 cc. and is recovered. It contains 3.6% nickel by weight in the form of thin, colloidal, hexagonal, sheet-like crystals, about 50 millimicrons in diameter. Separately, a 10% dispersion of fibrous colloidal boehmite is prepared, of which 37 grams containing about 2.5 grams of $Al_2O_3$ is mixed with 100 grams of the nickel hydroxide suspension in a high speed mixer. This material is dried at 100° C. to a light green, porous cake. It is heated to 300° C. in air and converted to a weak, porous, black cake. Then it is heated to 900° C. in air, giving a porous, light blue ceramic body, having the X-ray pattern of a spinel.

EXAMPLE 13

The following is an example of a catalyst body prepared from colloidal boehmite, thoroughly mixed with colloidal silica to obtain a composition sufficiently homogeneous in respect to the mixing of silica and alumina, that mullite, a strong refractory, can be formed at abnormally low temperature. This body is an active cracking catalyst when not fired to over 600° C.

It has long been known that when powdered alumina and silica are mixed, an extremely high temperature is required in order to bring about reaction between the two phases to form the composition mullite, $3Al_2O_3 \cdot 2SiO_2$ (72% $Al_2O_3$ by weight). However, by bringing about a very intimate mixing of colloidal alumina and colloidal silica, particularly in the form of fibrils of colloidal boehmite, coherent, shaped granules are produced. For example, 100 parts by weight of a colloidally dispersible dry powder of alumina containing about 70% by weight of $Al_2O_3$, in the form of boehmite crystalline fibrils about 100 millimicrons long and from 4 to 5 millimicrons in diameter, containing of the order of 10% by weight of bound acetic acid on the surface of the fibrils, is dispersed in 3 liters of distilled water containing 10 grams of nitric acid and 2.7 grams of hydrogen chloride. Separately, 90 grams of a 30% dispersion of colloidal silica, stabilized with a small amount of ammonia, having a particle diameter of about 15 millimicrons, is diluted with 1 liter of distilled water containing 5 grams of nitric acid. The diluted silica dispersion is then added to the alumina sol with good agitation to produce a viscous, thixotropic slurry, having a pH of 2.3. The two colloids mutually precipitated each other to form a thick slurry which is flocculated upon the addition of ammonia to raise the pH to 8.3. This mixture is then filtered to give a grease-like filter cake, which is extruded as ⅛" diameter rods, which are spread into a thin layer to air dry. These are broken up into translucent, ⅛" diameter x ¼" long granules, which are then dried at 110° C. This is used as a catalyst at 400° C. to dehydrate octanol-1 to octane.

EXAMPLE 14

Example of a ceramic made from colloidal silica and alumina. The granules of the above example are ground to a powder passing 300 meshes to the inch. A sample of the powder, comprising an intimate mixture of colloidal alumina and colloidal silica, is then cold pressed at 10 tons per sq. in. to a bar 2" long and ¼" x ¼" and then heated to 1000° C., whereupon X-ray examination indicated that no change had occurred other than the formation of gamma alumina from the colloidal fibrous alumina, together with some loss of specific surface area due to sintering. Another sample of the dried powder is hot-pressed at a temperature of 1600° C., to produce a non-porous, homogeneous ceramic body of mullite composition.

EXAMPLE 15

This is an example of a pelleted nickel spinel catalyst base. Twenty parts by weight of water dispersible fibrous boehmite is stirred into 800 parts by weight of water with violent agitation. Separately, 35 parts by weight of nickel nitrate hexahydrate is dissolved in 200 parts by weight of water, is added to the fibrous boehmite dispersion with good agitation, until a homogeneous slurry is obtained. Stirring is continued, while 238 parts by weight of 4% sodium hydroxide solution is added, to produce a slurry having a pH of 7.7. The precipitate is filtered, washed five times with 100 parts by weight of water, and three times with 100 parts by weight of methyl alcohol, and then dried under vacuum to give 29.5 parts by weight of pale green powder. This is pelleted in a pill making device and then fired for one hour at 1000° C. to obtain porous pellets of light blue color. An X-ray diffraction pattern shows a spinel pattern which is similar to that of gamma alumina, except that the lines are much sharper.

EXAMPLE 16

The following is an example of a hydrogenation catalyst of nickel on an alpha alumina substrate which is exceedingly stable toward sintering at high temperature.

Ten parts by weight of water-dispersible fibrous boehmite powder is dispersed in 200 parts by weight of water with strong agitation, and thereafter 4 parts by weight of colloidal nickel hydroxide containing 2.4% by weight of nickel is added to the colloidal alumina dispersion. Then 5 parts by weight of normal propanol are added to the viscous mass, which is then deaerated under vacuum and cast into shallow trays to dry to form sheet-like layers of slightly greenish colored alumina. This material is heated in hydrogen for 10 hours at 1400° C., giving black flakes which are still highly porous and have a specific surface area, by nitrogen adsorption, of 5 sq. meters per gram.

EXAMPLE 17

The following is an example of zirconia bonded with fibrous boehmite. Five parts by weight of dry fibrous boehmite powder is mixed mechanically with 30 parts by weight of 325 mesh zirconia powder, stabilized with about 5% by weight of calcium oxide. The two powders were thoroughly blended and then the mass is wetted with 13 parts by weight of water to give a stiff, clay-like mixture, which is readily extrudable. A thin film of this material is applied to the surface of a firebrick, and when almost dry, is pressed into place with a smooth plate. It is then dried very slowly and finally fired to 1200° C., where it gives a thin, adherent, ceramic coating, highly resistant to melting upon the impingement of a flame.

EXAMPLE 18

The following is an example of an alumino-silicate crucible for melting aluminum, made of a fibrous aluminosilicate bonded with colloidal alumina, molded and fired to a porous ceramic body: Forty parts by weight of chopped aluminosilicate fibers, around 25 microns diameter, in fragments between 1/8" and 1/4" long, are mixed with 16 parts by weight of dry, water-dispersible colloidal boehmite of the type which contain some sulfate, as described as a preferred type of fibrous colloidal boehmite employed in the processes of this invention. To this dry mixture, 0.8 part by weight of barium hydroxide octahydrate powder is added, the dry ingredient thoroughly mixed, and then moistened with 100 parts by weight of water. Upon the addition of water, and with continued mechanical working, a plastic mass is obtained which could be readily molded into the shape of a crucible. This crucible is dried and then fired to 1000° C., to give a firm, coherent, porous body. Aluminum is melted in this crucible at 800° C. It is observed that very little of the molten metal stuck to the walls of the crucible, and the metal poured out cleanly. The crucible has the further advantage, because of its low density and high porosity, of being a relatively good insulator, so that when it is removed from the furnace full of molten metal, it can be handled in the air for a much longer period of time, before the metal solidifies, than is the case with an ordinary fire clay crucible.

EXAMPLE 19

The following is an example of a gamma alumina ceramic reinforced with fibrous potassium titanate. One hundred grams of chopped fibrous potassium titanate, having a fiber length about 1/16" or less long, is mixed with 250 g. of water in a dough mixer. Separately, 73 g. of water-dispersible fibrous boehmite powder is mixed in a dough mixer with 370 g. of water. Then the wet potassium titanate is added to the fibrous boehmite mixture and the whole plastic mass is homogenized by thorough blending in a mechanical dough mixer. This plastic-like mass is then spread into molds of rectangular shape in a layer about 1/2" deep, and permitted to dry. The shaped body shrinks uniformly about 20% linearly, but remains coherent and replicates the shape, if not the size, of the mold. These rectangular boards are then slowly heated in an oven to 400° C. and then placed in a furnace and fired at 1000° C. for 30 minutes. There is thus obtained a light weight ceramic sheet having excellent insulating properties, which are used for protecting a laboratory bench top from injury by hot crucibles and other objects removed from furnaces.

EXAMPLE 20

This is an example of molding an object of fibrous colloidal boehmite and converting the molded object into a dense, strong ceramic product.

Five grams of fibrous boehmite powder of the type described in Example 1 is pressed in a 2" x 1/4" steel die at 10 t.s.i. for two minutes, using a solution of stearic acid in benzene as a lubricant for the steel walls of the die. The density of the molded bar so obtained is around 1.3 grams per cubic centimeter, and it has a transverse bend strength of about 1000 p.s.i.

The bar is preheated in air at the rate of 50° C. per hour to a maximum temperature of 1400° C., and held at this maximum temperature for ten hours. Following this preheating cycle, the bar is cooled to room temperature and placed in a vacuum furnace, where it is heated to 1600° C. at the rate of 100° C. per hour. It is sintered at the latter temperature in a vacuum for two hours to give a dense alpha alumina bar.

The alpha alumina bars made in this manner are about 95% of theoretical density (approximately 3.80 g./cc.), and have a modulus of rupture as measured by transverse bend (ASTM method C93–46) of around 30,000 p.s.i.

EXAMPLE 21

This is an example of molding a moist fibrous colloidal boehmite powder into coherent bars, and converting them into dense, strong ceramic products.

Four grams of fibrous boehmite powder described in Example 1 is humidified overnight in a water-saturated atmosphere, for example, over water in an evacuated desiccator. The powder adsorbs 15 to 20% by weight of water during humidification. The humidified powder is removed from the desiccator, placed in a stearic acid lubricated 2" x 1/4" steel die, and pressed at 10 t.s.i. for two minutes. Bars molded in this manner have a bulk density of about 1.86 g./cc. The molded bar is dried overnight at 100° C. in a vacuum oven, giving a coherent, green body with a density of about 1.50 g./cc., and a transverse bend strength of 1700 p.s.i.

The dry, molded bar is then preheated to 1400° C. in air at a rate of 50° C. per hour, and maintained at this temperature for 10 hours. It is cooled to room temperature, placed in a vacuum furnace and reheated to 1400° C. After reaching this temperature, the rate of heating is adjusted to 100° C. per hour, and the temperature is increased at this rate to 1600° C. Sintering is continued at this temperature in a vacuum for one to two hours, giving a strong, dense bar of alpha alumina.

Bars made in this way are about 95% of theoretical density and have a modulus of rupture as measured by transverse bend of 30,000 p.s.i.

EXAMPLE 22

This is an example of molding gamma alumina prepared from fibrous colloidal boehmite and converting the molded bars to dense, strong alumina ceramics by sintering.

Fibrous boehmite powder of the type described in Example 1 is heated overnight at 400° C. During this treatment, it is converted into fibrous gamma alumina of the same dimensions and specific surface area as the original powder. The gamma alumina powder obtained is pressed at 10 t.s.i. for two minutes in a stearic acid lubricated steel die, and the coherent compact obtained is fired to alpha alumina as described in Example 20. Bars of 2" x 1/4" x 1/4" prepared in this manner are about 95% dense, and have a modulus of rupture as measured by transverse bend of around 30,000 p.s.i.

EXAMPLE 23

This is an example of the preparation of dense, strong, alpha alumina bars by hot-pressing fibrous boehmite alumina.

Eight grams of the fibrous boehmite powder of the type described in Example 1 is pre-compacted in a 2" diameter steel die under a pressure of 13,000 p.s.i., forming a coherent wafer. This densified material is reground in a mortar, and the resulting powder is loaded into a 2" x ¼" graphite mold. The powder is pressed at 2000 p.s.i. at room temperature. After movement of the plunger has subsided, the powder is heated, by induction to 1000° C. over a period of about ten minutes, and to 1400° C. over the next 20 minutes. At this point the pressure is increased to 4000 p.s.i., and the temperature is raised from 1400 to 1600° C. This temperature is maintained for 30 minutes. At the end of this cycle, pressure is released, and the die is cooled to room temperature.

The strong, alpha alumina bars which are obtained in this manner are coated superficially with graphite, and it is desirable to polish and square such specimens before testing. They are completely dense, as measured by the standard ASTM method C20–46, and microscopic examination of thin sections shows a fine grain structure. The modulus of rupture of such bars as measured by transverse bend using a 1" span, ranges from 60,000 to 65,000 p.s.i.

EXAMPLE 24

This is an example of the preparation of strong, macrofibers of alpha alumina from fibrous boehmite alumina.

Colloidal boehmite alumina of the type described in Example 1 is mixed with water to obtain a viscous, clay-like mass, which is highly plastic. This plastic mass is obtained by diluting 215 grams of fibrous boehmite alumina with 325 grams of water and mixing for 3 minutes in a dough mixer at 60 r.p.m. The resulting composition contains 40% boehmite alumina. This aqueous paste is forced through a 5-mil spinneret into air at room temperature, using pressures of 1000 to 3500 p.s.i. As extruded, the filament is coherent enough to be wound up on a bobbin if desired, and it remains coherent when dried in air.

This filament is fired at the rate of 50° C./hour to 1600° C. in an electric furnace operating at atmospheric pressure, and is held at this temperature for 10 hours. A coherent macrofiber of alpha alumina is obtained, as shown by X-ray diffraction measurements. Microscopic examination shows such fibers to be smooth, cylindrical fibers, free from nodulation, with a diameter of about 2 mils.

EXAMPLE 25

It is also possible to obtain macrofibers of alpha alumina from the moist filaments described in Example 24 by a simple firing procedure. The filament is air dried and placed in the flame of an air-gas burner. While in the flame it becomes incandescent and sinters to a macrofiber which X-ray analysis shows is alpha alumina. Microscopic examination shows that the fiber is about 2 mils in diameter, and that some nodules are present indicating that melting occurs in some areas, presumably due to the catalytic action of the alumina on combustion.

EXAMPLE 26

This is an example of the preparation of a mullite fiber from colloidal boehmite alumina.

One hundred fourteen grams of a 50% silica aquasol containing particles with a specific surface area of 90 m.$^2$/g. is diluted with 323 grams of water. Ten cc. of 70% nitric acid is added, and then 204 grams of fibrous boehmite alumina of the type described in Example 1 is added slowly. This mixture is kneaded in a dough mixer for 3 minutes at about 60 r.p.m. to give a plastic mass.

This mass is extruded through a 5-mil spinneret at pressures of 1000 to 3500 p.s.i., giving coherent filaments which can be wound on a bobbin. These filaments are fired according to the schedule described in Example 24, giving coherent macrofibers of mullite, as shown by X-ray diffraction. Microscopic examination shows them to be smooth, cylindrical fibers with a diameter of about 2 mils.

EXAMPLE 27

This is an example of the preparation of a ceramic glass macrofiber containing $Al_2O_3$:$SiO_2$ in an equimolar ratio.

One hundred fourteen grams of 50% silica aquasol containing particles with a specific surface area of 90 m.$^2$/g. is diluted with 93 grams of water and 4.0 cc. of 70% nitric acid are added. Eighty-one grams of fibrous boehmite alumina of the type described in Example 1 is stirred into the acidified silica sol, and the mixture kneaded in a dough mixer for 3 minutes at a stirrer speed of about 60 r.p.m. The resulting plastic mass is extruded through a 5-mil spinneret using pressures of 1000 to 3500 p.s.i. Coherent, moist filaments are obtained which can be wound on a bobbin. When these filaments are fired to a maximum temperature of 1600° C. and cooled rapidly, ceramic macrofibers are obtained. X-ray diffraction analysis shows that they contain only small amounts of mullite. The remainder of the fiber is composed of an aluminosilicate glass containing an equimolar ratio of $Al_2O_3$ and $SiO_2$. Macroscopic examination shows that these fibers are about 2 mils in diameter.

EXAMPLE 28

This is an example of the preparation of dense, strong, high alumina ceramics from colloidal boehmite alumina powder containing magnesium oxide to inhibit grain growth during sintering.

One hundred grams of fibrous boehmite alumina powder of the type described in Example 1 is dispersed in 735 ml. of water, and 4.4 grams of magnesium acetate tetrahydrate dissolved in 50 ml. of water is added slowly while the mixture is stirred in a Waring Blendor. During this addition a total of 600 ml. of water was added periodically to maintain a fluid mixture. After these additions, stirring is continued in the blender for one hour. The dispersion is then frozen quickly with a Dry Ice-acetone mixture while stirring with a magnetic stirrer. The solidified mass is freeze-dried overnight in a vacuum.

The resulting powder is molded as described in Example 20, using a maximum pressure of 50 tons per square inch. The molded body obtained is fired to a maximum temperature of 1700° C., using the heating schedule described in Example 20. It is held at this maximum temperature for two hours in a vacuum, giving a dense, strong, translucent bar. X-ray examination shows that the final fired composition is alpha alumina. The density of bars obtained in this manner is approximately 98% of theoretical, and they have a modulus of rupture as measured by transverse bend (ASTM Method C93–46) of about 55,000 p.s.i.

EXAMPLE 29

This is an additional example of the preparation of a dense, strong, high alumina ceramic from colloidal boehmite alumina powder containing magnesium oxide to inhibit grain growth.

Three grams of magnesium acetate tetrahydrate is dissolved in 735 ml. of water, and 100 grams of fibrous boehmite alumina powder of the type described in Example 1 is added slowly while the solution is stirred in a Waring Blendor. After the boehmite powder is added, the fluid mixture is stirred for one hour in the blender. The mixture is then drum dried by feeding slowly to the nip of a double drum dryer having six-inch diameter rolls. The roll clearance is two mils, and the roll speed 2 r.p.m. The surface temperature of the rolls is 263° F.

The drum-dried powder is screened through a 20-mesh sieve, to remove any very large agglomerates.

The resulting powder is molded as described in Example 20, using a maximum pressure of 40 t.s.i. The molded body is heated in air at the rate of 50° per hour to 1400° C. It is held at this temperature for 10 hours. The firing temperature is then increased to 1600° C. at the rate of 100° C. per hour, and the body is maintained at this temperature for 20 hours. The dense, strong bars of alpha alumina were obtained, having a modulus of rupture of about 50,000 p.s.i., and a density of 3.92 grams per cc.

EXAMPLE 30

This is an example of the preparation of a high alumina ceramic prepared from colloidal boehmite alumina powder containing approximately 0.1% magnesium oxide.

Forty-four hundredths gram of magnesium acetate tetrahydrate is dissolved in 735 ml. of water, and 100 grams of fibrous boehmite alumina powder of the type described in Example 1 is added slowly while the mixture is stirred in a Waring Blendor. Stirring is continued for 1 hour after the final increment of the powder boehmite has been added. During this one-hour stirring period, 200 ml. of additional water is added in increments, to maintain fluidity. This mixture is then transferred to a series of 500 ml. round-bottom flasks which are rotated in a bath of Dry Ice-acetone while magnetically stirred. The quick-frozen mixture is attached to a vacuum pump and allowed to dry overnight.

The resulting fluffy powder is ground in a porcelain mortar and pestle to break up the loosely adherent aggregates. The fluffy powder is then precompacted at 5000 p.s.i., in a two-inch cylindrical steel die. The wafer is then reground in a mortar and pestle, and the dense powder is molded as described in Example 20, using a maximum pressure of 50 t.s.i. This molded body is heated in air at the rate of 50° C. per hour to a temperature of 1400° C., at which temperature it is maintained for 10 hours. The temperature is then increased to 1600° C. at the rate of 100° C. per hour, and maintained at 1600° C. for 20 hours.

Dense bars of alpha alumina are obtained which have a modulus of rupture of 43,000 to 45,000 p.s.i.

EXAMPLE 31

This is an example of the preparation of a dense, strong, high alumina ceramic from colloidal boehmite alumina powder containing approximately 2% magnesium oxide to inhibit grain growth.

One hundred grams of fibrous boehmite alumina powder of the type described in Example 1 is dispersed in 3000 ml. of water using a large Waring Blendor to provide the necessary agitation. Eight and eight-tenths grams of magnesium acetate tetrahydrate dissolved in 50 ml. of water is added slowly while the mixture is stirring. Blending is continued for 30 minutes after the addition of magnesium acetate. This slurry is spray-dried in 15.5″ diameter spray dryer, 7′ long. This dryer is equipped with a pneumatic spray nozzle and operated with an inlet air temperature of 300° C. and an outlet temperature of about 110° C. The fine, dry powder is collected in a cyclone. The powder is molded in a steel die with stearic acid as a lubricant at a maximum pressure of 43 t.s.i. The compacts obtained are heated in air according to the firing schedule described in Example 29, maintaining them at the maximum temperature of 1600° C. for 20 hours. The resulting bars of alpha alumina have a modulus of rupture of about 50,000 p.s.i., and a density of greater than 98% of theoretical.

EXAMPLE 32

This is an example of the preparation of a dense, high alumina ceramic body by impregnating a porous gamma alumina compact with sufficient magnesium oxide to provide about 3% on the basis of the alumina, and sintering.

Approximately 125 grams of fibrous boehmite alumina of the type described in Example 1 is pressed in a cylindrical steel die at a pressure of 10 t.s.i. The resulting coherent wafer is fired in air at the rate of 50° C. per hour to a maximum temperature of 500° C. It is maintained at this maximum temperature for 10 hours. The porosity of this fired compact is approximately 50%. This bar is suspended in 400 ml. of aqueous solution containing 130 grams of magnesium acetate tetrahydrate for a period of one hour. The moist bar is removed, and the water dissipated in a vacuum desicator over $P_2O_5$ at room temperature. The resulting body is then fired slowly (at the rate of 50° C. per hour) to a maximum temperature of 1400° C. It is held at this temperature for 10 hours. This bar is cooled and transferred to a vacuum furnace in which it is heated to a temperature of 1700° C. at the rate of 100° C. per hour. It is maintained under these conditions for two hours. A strong, dense, somewhat translucent bar of alpha alumina is obtained.

EXAMPLE 33

This is an example of the preparation of a high alumina ceramic from colloidal boehmite alumina powder containing approximately 2% cobalt oxide to inhibit grain growth.

Fifty-eight grams of fibrous boehmite alumina of the type described in Example 1 is dispersed in about 1150 ml. of water, in a large Waring Blendor. Three and three-tenths grams of cobaltous acetate tetrahydrate is dissolved in 100 ml. of distilled water and this solution is added dropwise to the colloidal boehmite suspension using continuous blending. After the final increment of the cobaltous acetate solution has been added, stirring is continued for an additional 30 minutes. This suspension is then drum-dried as described in Example 29. The resulting powder is pressed at 50 t.s.i. for 2 minutes, using a stearic acid lubricated steel die. The coherent bars obtained are sintered in air according to the schedule described in Example 29. Strong alpha alumina bars are obtained which are greater than 98% of theoretical density.

EXAMPLE 34

This is an example of the preparation of dense, strong, high alumina ceramics from colloidal boehmite alumina powder containing approximately 10% chromic oxide to inhibit grain growth.

Ninety grams of fibrous boehmite alumina powder of the type described in Example 1 is dispersed in 2000 ml. of water, and 32.5 grams of chromic acetate monohydrate dissolved in 100 ml. of water is added dropwise. The mixture is stirred in a laboratory blender during addition, and stirring is continued for 30 minutes, after the addition is completed. An additional 2000 ml. of water is added, and the dispersion is spray dried as described in Example 31.

The resulting powder is molded and fired as described in Example 28, using a final sintering period of two hours at 1700° C. in a vacuum. Strong, dense bars of alpha alumina are obtained.

EXAMPLE 35

This is an example of the preparation of dense, high alumina ceramics from colloidal boehmite alumina powder containing about 4% nickel oxide to inhibit grain growth.

Ninety-six grams of fibrous boehmite alumina powder of the type described in Example 1 is dispersed in 2000 ml. of water in a laboratory blender, and 13.3 grams of nickel acetate tetrahydrate dissolved in 100 ml. of water is added slowly. The mixture is stirred in a laboratory blender during addition, and blending is continued for 30 minutes, following the addition of the nickel acetate solution. The resulting mixture is drum-dried as described in Example 29. The dry powder is molded and sintered according to the schedule described in Example 29. Dense, strong bars of alpha alumina are obtained.

EXAMPLE 36

This is an example of the preparation of dense, high alumina ceramics from colloidal boehmite alumina powder containing small amounts of manganese oxide and silica to promote sintering and minimize grain growth.

A 5% boehmite colloidal alumina suspension is prepared by dispersing 56 grams of the fibrous alumina described in Example 1 in 1100 ml. of water. One and five-tenths grams of a 30% silica aquasol containing particles with an average diameter of about 17 millimicrons is diluted to 10 ml. with distilled water, and deionized, using sulfonic acid ion-exchange resin in the hydrogen form. The resin is removed and the solution is added dropwise to the colloidal boehmite alumina suspension. Blending is continued for 10 minutes following this addition. Six and nine-tenths grams of manganese acetate tetrahydrate are dissolved in 190 ml. of water and added dropwise to the boehmite alumina-silica suspension. Stirring is continued for 30 minutes following this addition.

The suspension is drum-dried as described in Example 29 and the resulting powder is molded at room temperature, using a maximum pressure of 15 t.s.i., as described in Example 20. The molded bar is fired in air according to the schedule described in Example 29, using a final sintering period of 10 hours at 1600° C. A dense, strong bar of alpha alumina is obtained.

When a maximum firing of only 1500° C. is employed, dense bars of alpha alumina are obtained which are essentially equivalent to those obtained at 1600° C.

EXAMPLE 37

This is an example of the preparation of a dense alumina body from fibrous colloidal boehmite alumina powder containing about 5% of uniformly distributed colloidal TiO$_2$ particles to promote sintering.

Fifty grams of fibrous boehmite alumina of the type described in Example 1, is dispersed in 1700 ml. of water in a laboratory blender. Fifty milliliters of a dilute aquasol containing 1.75 grams of colloidal titanium dioxide particles with an average diameter of about 20 millimicrons is added. Stirring is continued during the addition. The TiO$_2$ aquasol is prepared by hydrolysis of titanic sulfate, as described by Weiser in Inorganic Colloid Chemistry, volume II, page 262. A clear, homogeneous aquasol is obtained, which does not gel on standing.

This dispersion is freeze dried as described in Example 30, giving a fluffy white powder. This powder is precompacted and molded as described in Example 30, and the molded bars are heated in air to a temperature of 1400° C. at the rate of 50° C./hour, and held at 1400° C. to 1500° C. for 10 hours. Dense, strong, alpha alumina bars are obtained which contain approximately 5% TiO$_2$, distributed uniformly throughout the composition. In the absence of the TiO$_2$, weak, semi-porous bars would be obtained under these conditions.

I claim:

1. A colloidal, anisodiametric transition alumina selected from the class consisting of gamma, kappa, eta, delta and theta aluminas.

2. Colloidal anisodiametric gamma alumina.

3. Colloidal, fibrous gamma alumina having an average fiber diameter in the range of 3 to 10 millimicrons and an axial ratio of at least 3:1.

4. A porous, shaped body having a structure in which there is present from 1 to 100% by weight of colloidal ultimate particles of an anisodiametric alumina derived from colloidal anisodiametric boehmite by thermal dehydration at a temperature of about from 300° C. to the sintering point, the remainder of the body being metal oxides other than said anisodiametric alumina and the said alumina particles being joined together in a coherent mass.

5. A porous, shaped body having a structure consisting essentially of colloidal ultimate particles of an anisodiametric alumina derived from colloidal anisodiametric boehmite by thermal dehydration at a temperature of about from 300° C. to the sintering point, and an additional metal oxide which in said body is insoluble in water, joined together in a coherent mass.

6. A porous shaped body having a structure in which there is present at least 50% by weight of colloidal ultimate particles of an anisodiametric gamma alumina, the remainder of the body being water-insoluble metal oxides which are stable against thermal decomposition at temperatures up to 350° C. and which have a melting point above 350° C., and the said alumina particles being joined together in a coherent mass.

7. A porous, shaped body having a structure consisting essentially of colloidal ultimate particles of an anisodiametric transition alumina, and an additional metal oxide which in said body is insoluble in water, joined together in a coherent mass.

8. A porous catalyst base having a structure consisting essentially of colloidal, fibrous gamma alumina having an average fiber diameter in the range of 3 to 10 millimicrons and an axial ratio of at least 3:1, joined together as a coherent, shaped body.

9. A sintered, coherent shaped body consisting essentially of microcrystalline alpha alumina derived from a colloidal anisodiametric transition alumina by heating above about 1400° C. until the density is above about 3.8, said alpha alumina being characterized by having an average grain size of less than 10 microns.

10. A shaped body of claim 9 in which there is uniformly distributed up to about 2% by weight of a grain-growth inhibitor selected from the class consisting of cobalt oxide, magnesium oxide, chromium oxide, and nickel oxide.

11. A shaped body of claim 9 in which there is uniformly distributed up to about 2% by weight of a sintering promoter selected from the class consisting of manganese oxide, iron oxide, copper oxide, and titanium dioxide.

12. In a process for producing a colloidal, anisodiametric transition alumina the step comprising heating colloidal anisodiametric boehmite at a temperature in the range of 300 to 1000° C. until substantially complete conversion to transition alumina has occurred.

13. In a process for producing colloidal fibrous gamma alumina the step comprising heating colloidal fibrous boehmite at a temperature in the range of 350 to 850° C. until substantially complete conversion to gamma alumina has occurred.

14. In a process for producing a transition alumina body the steps comprising forming a mass of colloidal, anisodiametric boehmite particles into a body of the desired shape and heating the body at a temperature in the range of 300 to 1000° C. until the boehmite has been converted into a transition alumina.

15. In a process for producing a gamma alumina body the steps comprising forming a mass of colloidal anisodiametric boehmite particles into a body of the desired shape and heating the body at a temperature in the range of 350 to 850° C. until the boehmite has been converted into gamma alumina.

16. In a process for producing a coherent, porous, alpha alumina body the steps comprising forming a mass of colloidal, anisodiametric boehmite particles into a body of the desired shape, heating the body at a temperature in the range of 300 to 1000° C. until at least a portion of the boehmite has been converted into a transition alumina, and then further heating the body at a temperature in the range above about 1000° C. and below the sintering temperature until substantially all the boehmite and transition alumina has been converted to alpha alumina.

17. In a process for producing a dense, coherent alpha alumina body the steps comprising forming a mass of colloidal, anisodiametric boehmite particles into a body of the desired shape, heating the body at a temperature in the range of 300 to 1000° C. until at least a portion of the boehmite has been converted into a transition alumina, and then further heating the body at a temperature above the sintering temperature and below the melting point until substantially all the boehmite and transition alumina has been converted to alpha alumina.

18. In a process for producing a dense, coherent alpha alumina body the steps comprising forming a mass of colloidal, anisodiametric transition alumina particles into a body of the desired shape and heating the body at a temperature above the sintering temperature and below the melting point until substantially all the transition alumina has been converted to alpha alumina.

References Cited in the file of this patent

UNITED STATES PATENTS

| | | |
|---|---|---|
| 2,618,567 | Comstock | Nov. 18, 1952 |
| 2,800,518 | Pitzer | July 23, 1957 |
| 2,810,182 | Brandes | Oct. 22, 1957 |
| 2,947,056 | Csordas et al. | Aug. 2, 1960 |